(12) United States Patent
Tsuji et al.

(10) Patent No.: US 10,139,144 B2
(45) Date of Patent: Nov. 27, 2018

(54) AIR CONDITIONING APPARATUS

(71) Applicant: DAIKIN INDUSTRIES, LTD., Osaka-shi, Osaka (JP)

(72) Inventors: Yoshiyuki Tsuji, Sakai (JP); Yasushi Hori, Sakai (JP); Mariko Takakura, Sakai (JP); Yuusuke Oka, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/535,689

(22) PCT Filed: Dec. 7, 2015

(86) PCT No.: PCT/JP2015/084264
§ 371 (c)(1),
(2) Date: Jun. 13, 2017

(87) PCT Pub. No.: WO2016/098626
PCT Pub. Date: Jun. 23, 2016

(65) Prior Publication Data
US 2018/0274836 A1    Sep. 27, 2018

(30) Foreign Application Priority Data

Dec. 15, 2014 (JP) .................. 2014-253256

(51) Int. Cl.
*F25B 13/00* (2006.01)
*F25B 49/02* (2006.01)
*G05B 15/02* (2006.01)

(52) U.S. Cl.
CPC ............ *F25B 49/022* (2013.01); *F25B 13/00* (2013.01); *G05B 15/02* (2013.01);
(Continued)

(58) Field of Classification Search
None
See application file for complete search history.

(56) References Cited

U.S. PATENT DOCUMENTS 5,507,154 A * 4/1996 Grant ............... F25D 21/006
                                                      62/151
2015/0330690 A1 * 11/2015 Goel ................. G05B 15/02
                                                      62/175

FOREIGN PATENT DOCUMENTS

| JP | 60-133252 A | 7/1985 |
|---|---|---|
| JP | 4-93558 A | 3/1992 |
| JP | 101832618 A | 9/2010 |

OTHER PUBLICATIONS

European Search Report of corresponding EP Application No. 15 86 9831.6 dated Dec. 19, 2017.
(Continued)

*Primary Examiner* — Ryan A Jarrett
(74) *Attorney, Agent, or Firm* — Global IP Counselors, LLP

(57) ABSTRACT

A controller of an air conditioning apparatus performs a start/stop frequency-reducing rotation speed control in which the rotation speed of a compressor is controlled based on request values from indoor units requesting a decrease in air conditioning capacity, disregarding request values from indoor units requesting an increase in air conditioning capacity, when each indoor temperature at all indoor units performing air conditioning operation is within a scope of a prescribed threshold temperature range surrounding a target indoor temperature at each indoor unit performing air conditioning operation.

8 Claims, 8 Drawing Sheets

(52) U.S. Cl.
CPC ......... $F25B\ 2313/0233$ (2013.01); $F25B\ 2313/0314$ (2013.01); $F25B\ 2313/0315$ (2013.01); $F25B\ 2600/0251$ (2013.01); $F25B\ 2600/0253$ (2013.01); $F25B\ 2700/1931$ (2013.01); $F25B\ 2700/1933$ (2013.01); $F25B\ 2700/2104$ (2013.01)

(56) References Cited

OTHER PUBLICATIONS

International Preliminary Report of corresponding PCT Application No. PCT/JP2015/084264 dated Jun. 29, 2017.
International Search Report of corresponding PCT Application No. PCT/JP2015/084264 dated Mar. 1, 2016.

\* cited by examiner

AIR CONDITIONING APPARATUS

CROSS-REFERENCE TO RELATED APPLICATIONS

This U.S. National stage application claims priority under 35 U.S.C. § 119(a) to Japanese Patent Application No. 2014-253256, filed in Japan on Dec. 15, 2014, the entire contents of which are hereby incorporated herein by reference.

TECHNICAL FIELD

The present invention relates to an air conditioning apparatus, in particular, an air conditioning apparatus that is configured by connecting a plurality of indoor units and an outdoor unit having a compressor and performs air conditioning operations so that an indoor temperature at each indoor unit arrives at a target indoor temperature at each indoor unit.

BACKGROUND ART

There have conventionally been air conditioning apparatuses that are configured by connecting a plurality of indoor units and an outdoor unit having a compressor. In a certain variety of such air conditioning apparatuses, air conditioning operations (air-cooling operation and air-warming operation) are performed so that the indoor temperature at each indoor unit arrives at a target temperature in each indoor unit. During such air conditioning operations, when the indoor temperature at each indoor unit reaches the target indoor temperature and air conditioning operations are no longer necessary, indoor thermo-off to suspend air conditioning operation at the indoor units is performed and outdoor thermo-off to stop the compressor is performed when all of the indoor units assume the indoor thermo-off state. When the indoor temperature deviates from the target temperature after outdoor thermo-off and air conditioning operations are needed, an outdoor thermo-on to restart the compressor is performed and an indoor thermo-on to restart the air conditioning operations of the indoor units is performed. Therefore, thermo-start/stop, in which outdoor thermo-off and outdoor thermo-on are repeated, is likely to occur when the air conditioning operations are performed with the air conditioning capacity requested by each indoor unit being low and the indoor temperature being close to the target indoor temperature.

In response to this problem, there are air conditioning apparatuses configured so as to set a time in which stopping of the compressor (i.e., outdoor thereto-off) is prohibited in order to reduce the frequency of thereto-start/stop, as in Japanese Laid-open Patent Application No. 4-93558.

SUMMARY

In the method of thermo-start/stop reduction in Japanese Laid-open Patent Application No. 4-93558, a time in which stopping of the compressor outdoor thereto-off) is prohibited is set whereby the occurrence of outdoor thermo-off is suppressed and the frequency of thermo-start/stop can be reduced.

However, with such a method of setting a time in which outdoor thermo-off is prohibited, when the prohibiting time is increased, the compressor might not be stopped even when the air conditioning capacity requested by each indoor unit decreases and the indoor temperature becomes a temperature not wanted for air conditioning operations, and air conditioning operation in a state of excess air conditioning capacity might be continued. When the prohibiting time is set short, it might not be possible to suppress the occurrence of outdoor thermo-off and it might not be possible to sufficiently reduce the frequency of thermo-start/stop. Thus, by the method of setting a time in which outdoor thermo-off is prohibited, it is difficult to have the frequency of thermo-start/stop be reduced sufficiently while suppressing air conditioning operations in a state of excess air conditioning capacity. Air conditioning operations in a state of excess air conditioning capacity and/or an increase in the frequency of thermo-start/stop may cause increased power consumption or lowered operating efficiency of the compressor, and therefore such circumstances should be remedied to the extent possible.

An object of the present invention is to provide an air conditioning apparatus that is configured by connecting a plurality of indoor units and an outdoor unit having a compressor, and that performs air conditioning operations so that an indoor temperature at each indoor unit arrives at a target indoor temperature at each indoor unit, wherein the frequency of thermo-start/stop can be sufficiently reduced while suppressing air conditioning operations in a state of excess air conditioning capacity.

The air conditioning apparatus according to a first aspect is configured by connecting a plurality of indoor units and an outdoor unit having a compressor, and performs air conditioning operation so that an indoor temperature at each indoor unit arrives at a target indoor temperature at each indoor unit. The air conditioning apparatus has a controller to control a rotation speed of the compressor on the basis of a request value concerning air conditioning capacity at each indoor unit during the air conditioning operation. The controller performs a start/stop frequency-reducing rotation speed control in which the rotation speed of the compressor is controlled on the basis of the request values from the indoor units requesting a decrease in air conditioning capacity, disregarding the request values from the indoor units requesting an increase in air conditioning capacity, when each indoor temperature at all indoor units performing the air conditioning operation is within a scope of a prescribed threshold temperature range surrounding the target indoor temperature at each indoor unit performing the air conditioning operation.

According to the aspect described above, by performing start/stop frequency-reducing rotation speed control as described above, the rotation speed of the compressor is kept low and the occurrence of stopping of the compressor; i.e., outdoor thermo-off, can be suppressed while reducing the air conditioning capacity. Therefore, when air conditioning operations are performed with conditions in which the air conditioning capacity requested by each indoor unit is small and the indoor temperature is close to the target indoor temperature, the operation of the compressor can be continued to the extent possible while reducing the air conditioning capacity. As a consequence thereof, in this example, the frequency of thermo-start/stop can be sufficiently reduced while suppressing air conditioning operations in a state of excess air conditioning capacity.

The air conditioning apparatus according to a second aspect is the air conditioning apparatus according to the first aspect, wherein the start/stop frequency-reducing rotation speed control is to control the rotation speed of the compressor on the basis of the request value for which the extent of decrease in air conditioning capacity is smallest among the request values from the indoor units requesting a decrease in air conditioning capacity.

When performing start/stop frequency-reducing rotation speed control, the extent of reduction of the frequency of thermo-start/stop, or the like, comes to vary depending on how the request values from the indoor units requesting a decrease in air conditioning capacity are used. Here, the extent of reduction of the frequency of thermo-start/stop is improved when the rotation speed of the compressor is kept low, but there appears a tendency for the air conditioning capacity to become insufficient at indoor units requesting an increase in air conditioning capacity, and indoor temperatures having come close to the target indoor temperature up to within the scope of the threshold temperature range might deviate from the target indoor temperature and go beyond the scope of the threshold temperature range.

Therefore, in the aspect described above, a configuration is adopted to use the request value for which the extent of decrease in air conditioning capacity is smallest among the request values from the indoor units requesting a decrease in air conditioning capacity as described above. Therefore, the rotation speed of the compressor can be kept low, and the tendency for the air conditioning capacity to become insufficient at indoor units requesting an increase in air conditioning capacity can be suppressed as much as possible.

As for how to use the request values from indoor units requesting a decrease in air conditioning capacity, it may also be considered to use the request value for which the extent of decrease in air conditioning capacity is greatest among the request values from indoor units requesting a decrease in air conditioning capacity, but in this case, although the rotation speed of the compressor can be kept very low, it becomes difficult to suppress the tendency for the air conditioning capacity to become insufficient at indoor units requesting an increase in air conditioning capacity. It may also be considered to use the average value of the request values from indoor units requesting a decrease in air conditioning capacity, but in this case, the extent of keeping down the rotation speed of the compressor or the extent of suppressing the tendency for the air conditioning capacity to become insufficient at indoor units requesting an increase in air conditioning capacity comes to an intermediate extent between that of the case when using the request value for which the extent of decrease in air conditioning capacity is smallest and that of the case when using the request value for which the extent of decrease is greatest. Thus, when performing start/stop frequency-reducing rotation speed control, the extent of reduction of the frequency of thermo-start/stop, or the like, comes to vary depending on how the request values from indoor units requesting a decrease in air conditioning capacity are used. In this embodiment, emphasis is placed on the extent of suppressing the tendency for the air conditioning capacity to become insufficient at indoor units requesting an increase in air conditioning capacity, and it is arranged to use the request value for which the extent of decrease in air conditioning capacity is smallest among the request values from indoor units requesting a decrease in air conditioning capacity.

The air conditioning apparatus according to a third aspect is the air conditioning apparatus according to the first or second aspect, wherein the threshold temperature range is a thermo temperature range that specifies a timing of indoor thermo-off, which suspends the air conditioning operations of the indoor units performing the air conditioning operations and indoor thermo-on, which restarts the air conditioning operations of the indoor units in the indoor thermo-off state.

According to the aspect described above, by making the threshold temperature range coincide with the thermo temperature range, the rotation speed of the compressor can be kept low until all of the indoor units come to indoor thermo-off, and the occurrence of stopping of the compressor; i.e., outdoor thermo-off can be suppressed while reducing the air conditioning capacity.

The air conditioning apparatus according to a fourth aspect is the air conditioning apparatus according to any one of the first to third aspects, wherein the controller performs a normal rotation speed control in which the rotation speed of the compressor is controlled on the basis of the request value for which the extent of increase in air conditioning capacity is greatest among the request values from the indoor units requesting an increase in air conditioning capacity, when there are indoor units for which the indoor temperature is beyond the scope of the threshold temperature range and increase in air conditioning capacity is being requested among the indoor units performing the air conditioning operations.

According to the aspect described above, the normal rotation speed control and the start/stop frequency-reducing rotation speed control as described above come to be switched in accordance with the indoor temperatures at the indoor units performing air conditioning operations. In other words, when there are indoor units for which the indoor temperature is beyond the scope of the threshold temperature range and air conditioning capacity is being requested, the rotation speed of the compressor is controlled on the basis of the request value for which the extent of increase in air conditioning capacity is greatest, so that the indoor temperatures are quickly brought closer to the target indoor temperature. When the indoor temperatures at all indoor units performing air conditioning operations are within the scope of the threshold temperature range and the air conditioning capacity requested by each indoor unit has become small, the rotation speed of the compressor is controlled on the basis of the request value from the indoor unit requesting a decrease in air conditioning capacity, so that the operation of the compressor can be continued to the extent possible while reducing the air conditioning capacity. As a consequence thereof, in the aspect described above, the indoor temperatures can be quickly brought closer to the target indoor temperature during air conditioning operations, and air conditioning operations in a state of excess air conditioning capacity can be suppressed and the frequency of thermo-start/stop can be reduced thereafter.

DESCRIPTION OF EMBODIMENTS

An embodiment of the air conditioning apparatus according to the present invention is described below with reference to the drawings. The specific configuration of the embodiments of the air conditioning apparatus according to the present invention is not limited to the embodiment thereof described below, and modifications are possible within a range that does not depart from the scope of the invention.

(1) Basic Configuration of the Air Conditioning Apparatus

Figure 1:
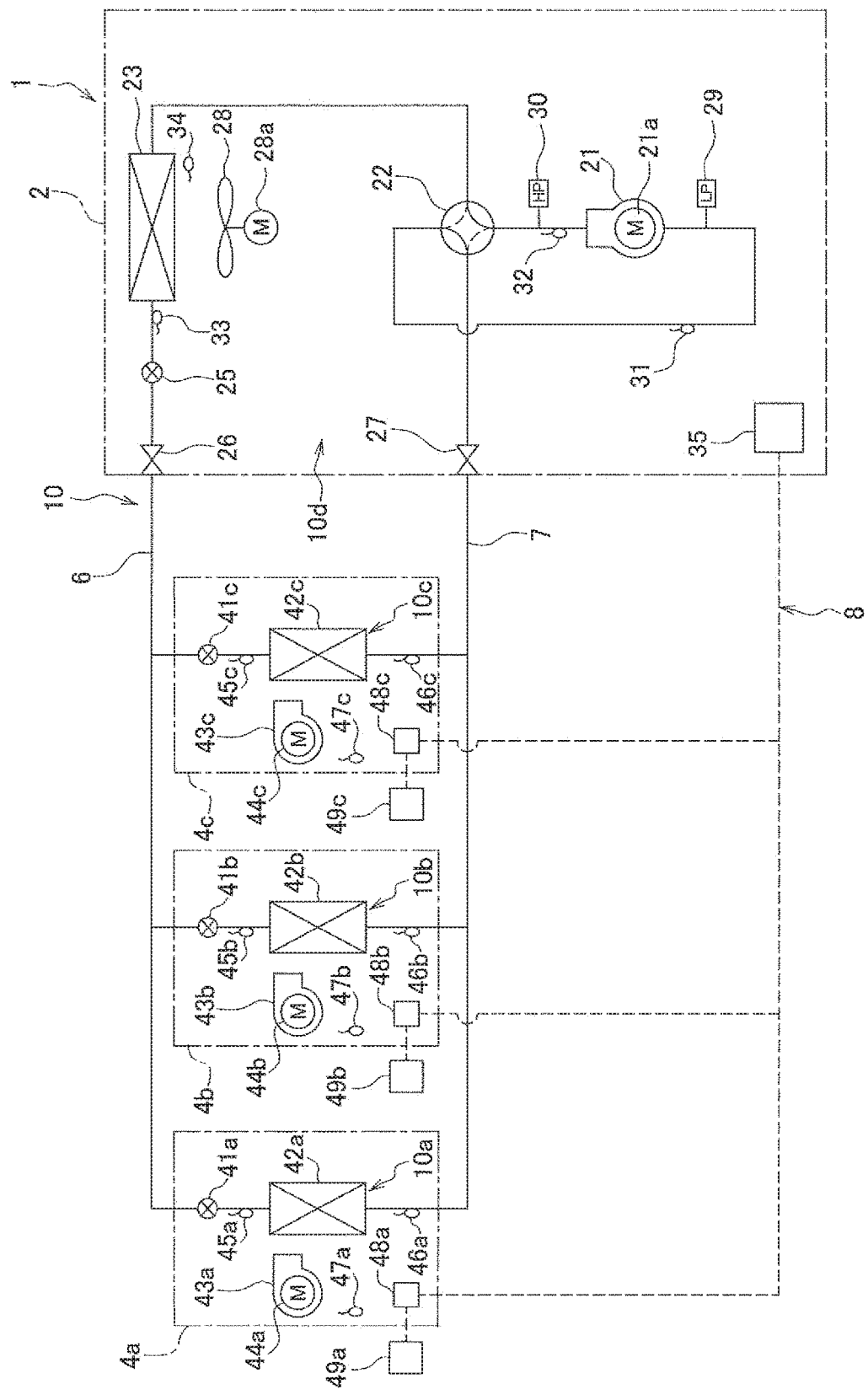
FIG. 1 is a schematic structural diagram of the air conditioning apparatus according to an embodiment of the present invention.

FIG. 1 is a schematic structural diagram of the air conditioning apparatus 1 according to an embodiment of the present invention. The air conditioning apparatus 1 is used for air conditioning a building or other indoor space by a vapor compression-type refrigerant cycle operation. The air conditioning apparatus 1 is mainly composed of an outdoor unit 2 and a plurality of (three, in this example) indoor units 4a, 4b, 4c that are connected to each other. In this embodiment, the outdoor unit 2 and the plurality of indoor units 4a, 4b, 4c are connected to each other via a liquid refrigerant communication pipe 6 and a gas refrigerant communication pipe 7. In other words, a vapor compression-type refrigerant circuit 10 of the air conditioning apparatus 1 is configured by the outdoor unit 2 and the plurality of indoor units 4a, 4b, 4c being connected to each other via the refrigerant communication pipes 6, 7. The number of indoor units is not limited to three and may be more than three or less than three.

<Indoor Unit>

The indoor units 4a, 4b, 4c are installed indoors. The indoor units 4a, 4b, 4c are connected to the outdoor unit 2 via the refrigerant communication pipes 6, 7, and constitute a portion of the refrigerant circuit 10.

Next, the configuration of the indoor units 4a, 4b, 4c shall be described. Because the indoor unit 4b and the indoor unit 4c have the same configuration as that of the indoor unit 4a, only the configuration of the indoor unit 4a is described in the present embodiment, and for the configurations of the indoor units 4b, 4c, the subscripts b and c are assigned instead of the subscript a which indicates the parts of the indoor unit 4a, and descriptions of the indoor units 4b, 4c is omitted.

The indoor unit 4a mainly has an indoor-side refrigerant circuit 10a (indoor-side refrigerant circuit 10b, 10c in the indoor unit 4b, 4c) constituting a portion of the refrigerant circuit 10. The indoor-side refrigerant circuit 10a mainly has an indoor expansion valve 41a and an indoor heat exchanger 42a.

The indoor expansion valve 41a is a valve for decompressing refrigerant flowing through the indoor-side refrigerant circuit 10a to regulate the flow rate of the refrigerant. The indoor expansion valve 41a is an electric expansion valve connected to the liquid side of the indoor heat exchanger 42a.

The indoor heat exchanger 42a is a heat exchanger that functions as a refrigerant evaporator or refrigerant radiator, and is configured from a plurality of heat transfer tubes and a plurality of fins. An indoor fan 43a for sending indoor air to the indoor heat exchanger 42a is provided close to the indoor heat exchanger 42a. Indoor air is blown onto the indoor heat exchanger 42a by the indoor fan 43a, whereby heat exchange is brought about between the refrigerant and the indoor air in the indoor heat exchanger 42a. The indoor fan 43a is rotatably driven by an indoor fan motor 44a.

Various sensors are provided to the indoor unit 4a. A liquid-side temperature sensor 45a for detecting the temperature Trla of refrigerant in a liquid state or in a gas-liquid two-phase state is provided to the liquid side of the indoor heat exchanger 42a. On the gas side of the indoor heat exchanger 42a, a gas-side temperature sensor 46a is provided for detecting the temperature Trga of the gas-state refrigerant. On the indoor air intake port side of the indoor unit 4a, there is provided an indoor temperature sensor 47a for detecting the air temperature in the air-conditioned space cooled or heated by the indoor heat exchanger 42a of the indoor unit 4a; i.e., the temperature (indoor temperature Tra) of the indoor air in the indoor unit 4. The indoor unit 4a has an indoor-side controller 48a to control the actions of the components constituting the indoor unit 4a. The indoor-side control controller 48a has a microcomputer, memory, and the like provided to control the indoor unit 4a, and is capable of exchanging control signals and the like with the remote control 49a for individually operating the indoor unit 4a and exchanging control signals or the like with the outdoor unit 2. The remote control 49a is a device for the user to perform various settings concerning air conditioning operations or to send operate/stop commands. The indoor temperature sensor 47a may be provided in the remote control 49a rather than in the indoor unit 4a.

<Outdoor Unit>

The outdoor unit 2 is installed outdoors. The outdoor unit 2 is connected to the indoor units 4a, 4b, 4c via the refrigerant communication pipes 6, 7 and constitutes a portion of the refrigerant circuit 10.

Next, the configuration of the outdoor unit 2 shall be described.

The outdoor unit 2 mainly has an outdoor-side refrigerant circuit 10d constituting a portion of the refrigerant circuit 10. The outdoor-side refrigerant circuit 10d mainly has a compressor 21, a four-way switching valve 22, an outdoor heat exchanger 23, an outdoor expansion valve 25, a liquid-side shutoff valve 26, and a gas-side shutoff valve 27.

The compressor 21 is a hermetic compressor in which a compression element (not shown) and a compressor motor 21a for rotatably driving the compression element are accommodated in a casing. The compressor motor 21a is designed so that electric power is supplied via an inverter device (not shown), and the operating capacity can be varied by changing the output frequency (i.e., the rotational speed) of the inverter device.

The four-way switching valve 22 is a valve for switching the direction of the flow of the refrigerant. The four-way switching valve 22 is capable of connecting the discharge side of the compressor 21 with the gas side of the outdoor heat exchanger 23 and connecting the intake side of the compressor 21 with the gas refrigerant communication pipe 7 (see the solid line of the four-way switching valve 22 in FIG. 1) to enable the outdoor heat exchanger 23 to function as a radiator of refrigerant compressed in the compressor 21 and to enable the indoor heat exchangers 42a, 42b, 42c to function as evaporators of refrigerant radiated in the outdoor heat exchanger 23 during an air-cooling operation as one of the air conditioning operations. The four-way switching valve 22 is capable of connecting the discharge side of the compressor 21 with the gas refrigerant communication pipe 7 and connecting the intake side of the compressor 21 with the gas side of the outdoor heat exchanger 23 (see the broken line of the four-way switching valve 22 in FIG. 1) to enable the indoor heat exchangers 42a, 42b, 42c to function as radiators of refrigerant compressed in the compressor 21 and to enable the outdoor heat exchanger 23 to function as an evaporator of refrigerant radiated in the indoor heat exchangers 42a, 42b, 42c during an air-warming operation as another of the air cooling operations.

The outdoor heat exchanger 23 is a heat exchanger that functions as a refrigerant radiator or a refrigerant evaporator, and is configured with a plurality of heat transfer tubes and a plurality of fins. Provided in proximity to the outdoor heat exchanger 23 is an outdoor fan 28 for sending outdoor air to the outdoor heat exchanger 23. Outdoor air is blown onto the outdoor heat exchanger 23 by the outdoor fan 28, whereby heat exchange is brought about between the refrigerant and the outdoor air in the outdoor heat exchanger 23. The outdoor fan 28 is rotatably driven by an outdoor fan motor 28a.

The outdoor expansion valve 25 decompresses refrigerant flowing through the outdoor-side refrigerant circuit 10d. The outdoor expansion valve 25 is an electric expansion valve connected to the liquid side of the outdoor heat exchanger 23.

The liquid-side shutoff valve 26 and the gas-side shutoff valve 27 are provided to the connection ports of the exterior devices and pipes (specifically, the liquid refrigerant communication pipe 6 and the gas refrigerant communication pipe 7). The liquid-side shutoff valve 26 is connected to the outdoor expansion valve 25. The gas-side shutoff valve 27 is connected to the four-way switching valve 22.

Various sensors are provided to the outdoor unit 2. The outdoor unit 2 is provided with an intake pressure sensor 29 for detecting the intake pressure Ps of the compressor 21, a discharge pressure sensor 30 for detecting the discharge pressure Pd of the compressor 21, an intake temperature sensor 31 for detecting the intake temperature Ts of the compressor 21, and a discharge temperature sensor 32 for detecting the discharge temperature Td of the compressor 21. The intake temperature sensor 31 is provided on the intake side of the compressor 21. A liquid-side temperature sensor 33 for detecting the temperature Tol of refrigerant in a liquid state or in a gas-liquid two-phase state is provided to the liquid side of the outdoor heat exchanger 23. On the outdoor air intake port side of the outdoor unit 2, there is provided an outside air temperature sensor 34 for detecting the temperature (outside air temperature Ta) of the outdoor air in the outdoor unit 2. The outdoor unit 2 has an outdoor-side controller 35 to control the actions of the components constituting the outdoor unit 2. The outdoor-side controller 35 has a microcomputer, memory, an inverter circuit to control the compressor motor 21a and the like provided to control the outdoor unit 2, and is capable of exchanging control signals and the like with the indoor-side controllers 48a, 48b, 48c of the indoor units 4a, 4b, 4c.

<Refrigerant Communication Pipes>

The refrigerant communication pipes 6, 7 are refrigerant pipes constructed on-site when the air conditioning apparatus 1 is installed. The liquid refrigerant communication pipe 6 extends from a liquid-side connection port (in this example, the liquid-side shutoff valve 26) of the outdoor unit 2, branches partway therealong to the plurality of (in the present embodiment, three) indoor units 4a, 4b, 4c, and extends to liquid-side connection ports (in the present embodiment, refrigerant pipes connected to the indoor expansion valves 41a, 41b, 41c) of the indoor units 4a, 4b, 4c. The gas refrigerant communication pipe 7 extends from a gas-side connection port (in the present embodiment, the gas-side shutoff valve 27) of the outdoor unit 2, branches partway therealong to a plurality of (in the present embodiment, three) indoor units 4a, 4b, 4c, and extends to gas-side connection ports (in the present embodiment, refrigerant pipes connected to the gas sides of the indoor heat exchangers 42a, 42b, 42c) of the indoor units 4a, 4b, 4c. The refrigerant communication pipes 6, 7 having various lengths or pipe diameters are used in accordance with the conditions of setup of the outdoor unit 2 and the indoor units 4a, 4b, 4c.

<Controller>

Figure 2:
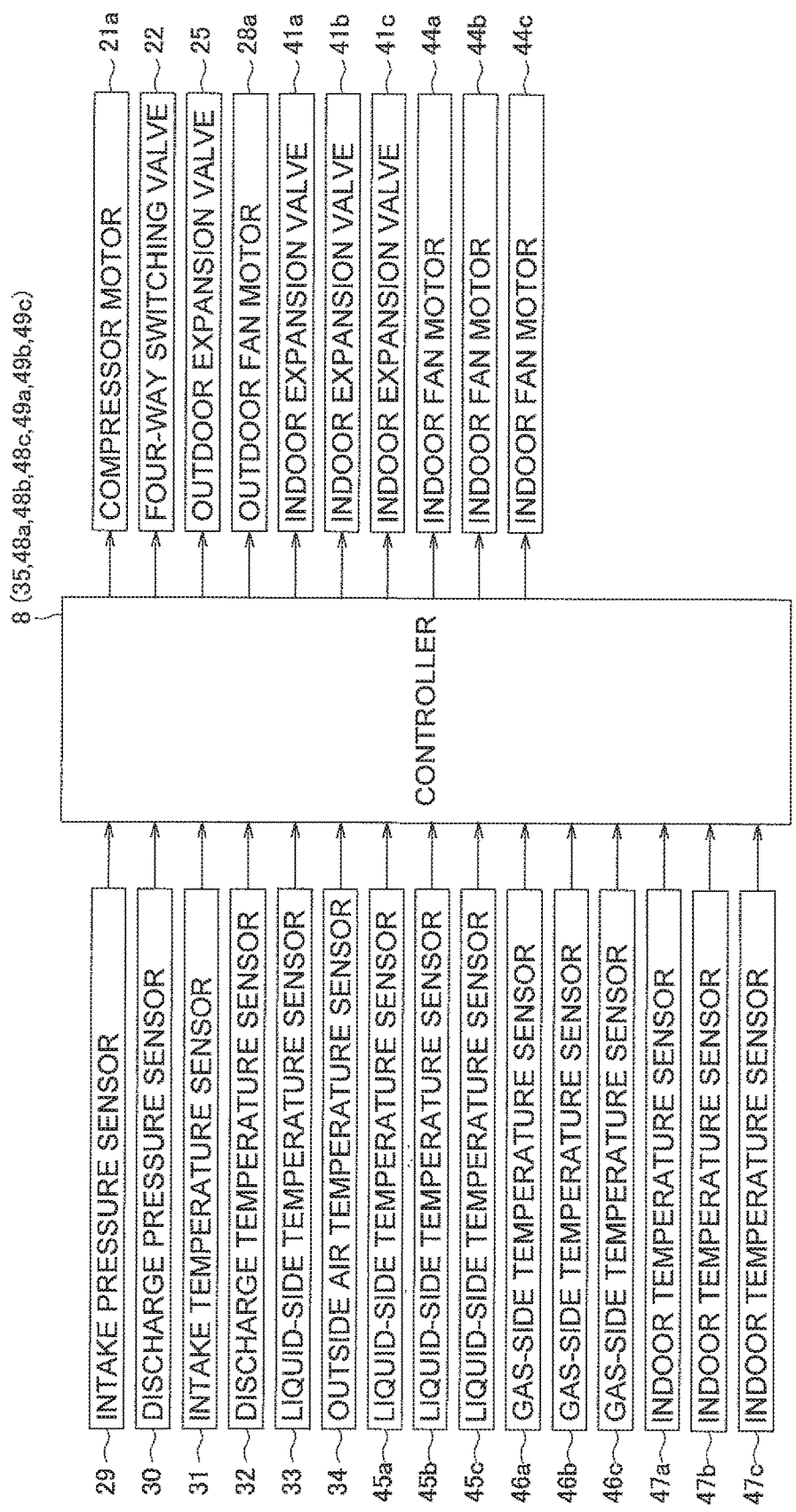
FIG. 2 is a control block diagram of the air conditioning apparatus.

Remote controls 49a, 49b, 49c for individually operating the indoor units 4a, 4b, 4c, the indoor-side controllers 48a, 48b, 48c of the indoor units 4a, 4b, 4c, and the outdoor-side controller 35 of the outdoor unit 2 compose of a controller 8 to control the overall operation of the air conditioning apparatus 1. The controller 8 is connected so as to be able to receive detection signals from the various sensors 29 to 34, 45a to 45c, 46a to 46c, 47a to 47c, and the like, as shown in FIG. 2. The controller 8 is configured so as to be able to carry out air conditioning operations (air-cooling operation and air-warming operation) by controlling the various devices and valves 21a, 22, 25, 28a, 41a to 41c, 44a to 44c on the basis of these detection signals or the like. FIG. 2 is a control block diagram of the air-conditioning apparatus 1.

As above, the air conditioning apparatus 1 is configured by connecting the plurality of (in the present embodiment, three) indoor units 4a, 4b, 4c with the outdoor unit 2 having the compressor 21, and performs air conditioning operations so that an indoor temperature Tra, Trb, Trc at each indoor unit 4a, 4b, 4c arrives at a target indoor temperature Tras, Trbs, Trcs at each indoor unit 4a, 4b, 4c. Setting of these target indoor temperatures Tras, Trbs, Trcs is performed by users using the remote controls 49a, 49b, 49c.

(2) Basic Actuation and Basic Control of the Air Conditioning Apparatus

<Basic Actuation>

The basic actuation of the air-conditioning operation (air-cooling operation and air-warming operation) of the air conditioning apparatus 1 is next described with reference to FIG. 1.

—Air-Cooling Operation—

When commands for the air-cooling operation are given from the remote controls 49a, 49b, 49c, the four-way switching valve 22 is switched to the air-cooling operation state (state indicated by the solid line of the four-way switching valve 22 in FIG. 1), and the compressor 21, outdoor fan 28, and indoor fans 43a, 43b, 43c are started up.

At this time, the low-pressure gas refrigerant in the refrigerant circuit 10 is taken into the compressor 21 and compressed to become a high-pressure gas refrigerant. This high-pressure gas refrigerant is fed to the outdoor heat exchanger 23 through the four-way switching valve 22. The high-pressure gas refrigerant sent to the outdoor heat exchanger 23 is condensed by undergoing heat exchange with outdoor air fed by the outdoor fan 28 and being cooled to become high-pressure liquid refrigerant in the outdoor heat exchanger 21, which functions as a radiator for the refrigerant. The high-pressure liquid refrigerant is sent from the outdoor unit 2 to the indoor units 4a, 4b, 4c via the outdoor expansion valve 25, the liquid-side shutoff valve 26 and the liquid refrigerant communication pipe 6.

The high-pressure liquid refrigerant sent to the indoor units 4a, 4b, 4c is decompressed by the indoor expansion valves 41a, 41b, 41c to become low-pressure refrigerant in gas-liquid two-phase state. The low-pressure refrigerant in a gas-liquid two-phase state is sent to the indoor heat exchangers 42a, 42b, 42c. The low-pressure refrigerant in a gas-liquid two-phase state sent to the indoor heat exchangers 42a, 42b, 42c is evaporated by undergoing heat exchange with indoor air fed by the indoor fans 43a. 43b, 43c and being heated to become low-pressure gas refrigerant in the indoor heat exchangers 42a, 42b, 42c, which function as evaporators for the refrigerant. The low-pressure gas refrigerant is sent from the indoor units 4a, 4b, 4c to the outdoor unit 2 via the gas refrigerant communication pipe 7.

The low-pressure gas refrigerant sent to the outdoor unit 2 is again taken into the compressor 21 via the gas-side shutoff valve 27 and the four-way switching valve 22.

—Air-Warming Operation—

When commands for the air-warming operation are given from the remote controls 49a, 49b, 49c, the four-way switching valve 22 is switched to the air-warming operation state (state indicated by the broken line of the four-way switching valve 22 in FIG. 1), and the compressor 21, outdoor fan 28, and indoor fans 43a, 43b, 43c are started up.

At this time, the low-pressure gas refrigerant in the refrigerant circuit 10 is taken into the compressor 21 and compressed to become a high-pressure gas refrigerant. The high-pressure gas refrigerant is sent from the outdoor unit 2 to the indoor units 4a, 4b, 4c via the four-way switching valve 22, the gas-side shutoff valve 27 and the gas refrigerant communication pipe 7.

The high-pressure gas refrigerant sent to the indoor units 4a, 4b, 4c is sent to the indoor heat exchangers 42a, 42b, 42c. The high-pressure gas refrigerant sent to the indoor heat exchangers 42a, 42b, 42c is condensed by undergoing heat exchange with indoor air fed by the indoor fans 43a, 43b, 43c and being cooled to become high-pressure liquid refrigerant in the indoor heat exchangers 42a, 42b, 42c, which function as radiators for the refrigerant. The high-pressure liquid refrigerant is decompressed by the indoor expansion valves 41a, 41b, 41c. The refrigerant decompressed by the indoor expansion valves 41a, 41b, 41c is sent from the indoor units 4a, 4b, 4c to the outdoor unit 2 via the gas refrigerant communication pipe 7.

The refrigerant sent to the outdoor unit 2 is sent to the outdoor expansion valve 25 via the gas-side shutoff valve 27 and decompressed by the outdoor expansion valve 25 to become low-pressure refrigerant in a gas-liquid two-phase state. The low-pressure refrigerant in a gas-liquid two-phase state is sent to the outdoor heat exchanger 23. The low-pressure refrigerant in a gas-liquid two-phase state sent to the outdoor heat exchanger 23 is evaporated by undergoing heat exchange with outdoor air fed by the outdoor fan 28 and being heated to become low-pressure gas refrigerant in the outdoor heat exchanger 23, which functions as an evaporator for the refrigerant. The low-pressure refrigerant in a gas state is again taken into the compressor 21 by way of the four-way switching valve 22.

<Basic Control>

In the above air conditioning operations (air-cooling operation and air-warming operation), the air conditioning capacities (air-cooling capacity and air-warming capacity) as below are controlled so that the indoor temperature Tra, Trb, Trc at each indoor unit 4a, 4b, 4c is brought to the target indoor temperature Tras, Trbs, Trcs at each indoor unit 4a, 4b, 4c.

—During Air-Cooling Operation—

When the air conditioning operation is the air-cooling operation, the controller 8 controls the capacity of the compressor 21 on the basis of a target evaporation temperature Tes.

Capacity control of the compressor 21 is accomplished by controlling the rotation speed (operating frequency) of the compressor 21 (more specifically, the compressor motor 21a). Specifically, the rotation speed of the compressor 21 is controlled so that an evaporation temperature Te of the refrigerant equivalent to a low pressure Pe of the refrigerant circuit 10 arrives at the target evaporation temperature Tes. Here, low pressure Pe signifies the pressure representative of low-pressure refrigerant flowing from outlets of the indoor expansion valves 41a, 41b, 41c through the indoor heat exchangers 42a, 42b, 42c to the intake side of the compressor 21 during the air-cooling operation. In this embodiment, an intake pressure Ps, which is the refrigerant pressure detected by the intake pressure sensor 29, is used as the low pressure Pe, and a value obtained by converting the intake pressure Ps to the saturation temperature of the refrigerant is the evaporation temperature Te of the refrigerant.

The target evaporation temperature Tes in capacity control (rotation speed control) of the compressor 21 is decided in the controller 8 on the basis of request values $\Delta QCa$, $\Delta QCb$, $\Delta QCc$ concerning the air-cooling capacity at each indoor unit 4a, 4b, 4c performing the air-cooling operation.

Specifically, first, each temperature difference $\Delta TCra$, $\Delta TCrb$, $\Delta TCrc$ is obtained by subtracting each target indoor temperature Tras, Trbs, Trcs from each indoor temperature Tra. Trb, Trc at each indoor unit 4a, 4b, 4c performing the air-cooling operation. The request values $\Delta QCa$, $\Delta QCb$, $\Delta QCc$ concerning the air-cooling capacity at each indoor unit 4a, 4b, 4c performing the air-cooling operation are calculated on the basis of these temperature differences $\Delta TCra$, $\Delta TCrb$, $\Delta TCrc$. Here, when the temperature differences $\Delta TCra$, $\Delta TCrb$, $\Delta TCrc$ are positive values; i.e., when the indoor temperatures Tra, Trb, Trc have not reached the target indoor temperatures Tras, Trbs, Trcs, it signifies that an increase in air-cooling capacity is requested, and the extent of the request for increase in air-cooling capacity is greater as the absolute values of these are greater. Meanwhile, when the temperature differences $\Delta TCra$, $\Delta TCrb$. $\Delta TCrc$ are negative values; i.e., when the indoor temperatures Tra. Trb, Trc have reached the target indoor temperatures Tras, Trbs, Tres, this signifies that a decrease in air-cooling capacity is requested, and the extent of the request for decrease in air-cooling capacity is greater as the absolute values of these are greater. Therefore, as with the temperature differences $\Delta TCra$. $\Delta TCrb$, $\Delta TCrc$, the request values $\Delta QCa$, $\Delta QCb$. $\Delta QCc$ concerning the air-cooling capacity are also values signifying the direction and extent of increase or decrease in air-cooling capacity.

When an increase in air-cooling capacity is requested; i.e., when the request values $\Delta QCa$, $\Delta QCb$, $\Delta QCc$ concerning the air-cooling capacity are positive values, the target evaporation temperature Tes is decided to be lower than the current value in accordance with the extent of increase (absolute value of the request value), whereby the rotation speed of the compressor 21 is increased and the air-cooling capacity is increased. Meanwhile, when a decrease in the air-cooling capacity is requested; i.e., when the request values $\Delta QCa$, $\Delta QCb$, $\Delta QCc$ concerning the air-cooling capacity are negative values, the target evaporation temperature Tes is decided to be higher than the current value in accordance with the extent of decrease (absolute value of the request value), whereby the rotation speed of the compressor 21 is decreased and the air-cooling capacity is decreased.

Here, at each indoor unit 4a, 4b, 4c performing the air-cooling operation, various requests for increase or decrease in air-cooling capacity (request values $\Delta QCa$, $\Delta QCb$, $\Delta QCc$) are made in accordance with each temperature difference $\Delta TCra$, $\Delta TCrb$, $\Delta TCrc$. However, the target evaporation temperature Tes is a target value that is common to all indoor units 4a, 4b, 4c. Therefore, the target evaporation temperature Tes must be set to a value representative of the requests for increase or decrease in air-cooling capacity at all indoor units 4a, 4b, 4c. Therefore, the target evaporation temperature Tes is decided on the basis of the request value for which the target evaporation temperature Tes is lowest among the request values $\Delta QCa$, $\Delta QCb$. $\Delta QCc$ concerning the air-cooling capacity. For example, when the request values $\Delta QCa$, $\Delta QCb$, $\Delta QCc$ concerning the air-cooling capacity are evaporation temperatures requested at the indoor units 4a, 4b, 4c, the lowest request value of these is selected as the target evaporation temperature Tes. Specifically, when the request value $\Delta QCa$ as the evaporation temperature requested at the indoor unit 4a is 5° C., the request value $\Delta QCb$ as the evaporation temperature requested at the indoor unit 4b is 7° C., and the request value $\Delta QCc$ as the evaporation temperature requested at the indoor unit 4c is 10° C., then 5° C. being the request value $\Delta QCa$ that is the lowest request value of these is selected as the target evaporation temperature Tes. When the request values $\Delta QCa$, $\Delta QCb$, $\Delta QCc$ concerning the air-cooling capacity are values indicating the extent of increase or decrease of evaporation temperature requested at the indoor units 4a, 4b, 4c, the target evaporation temperature Tes is decided on the basis of the request value for which the air-cooling capacity is greatest of these. Specifically, if the current target evaporation temperature Tes is 12° C. and the request values $\Delta QCa$, $\Delta QCb$, $\Delta QCc$ concerning the air-cooling capacity indicate how low to set the evaporation temperature, and when the request value $\Delta QCa$ requested at the indoor unit 4a is 7° C., the request value $\Delta QCb$ requested at the indoor unit 4b is 5° C. and the request value $\Delta QCc$ requested at the indoor unit 4c is 2° C., then 7° C. being the request value $\Delta QCa$ that is the greatest request value of these is adopted, and the temperature (5° C.) obtained by subtracting from the current target evaporation temperature Tes (12° C.) is set as the target evaporation temperature Tes.

In this embodiment, the rotation speed of the compressor 21 is controlled so that the evaporation temperature Te of the refrigerant arrives at the target evaporation temperature Tes, but instead of this, the rotation speed of the compressor 21 may be controlled so that the low pressure Pe (intake pressure Ps) equivalent to the evaporation temperature Te of the refrigerant arrives at the target low pressure Pes. In this case, the request values $\Delta QCa$, $\Delta QCb$, $\Delta QCc$ used also become values corresponding to the low pressure Pe or the target low pressure Pes.

Thermo control, as described below, is performed by the controller 8 when the indoor temperatures Tra, Trb, Trc at the indoor units 4a, 4b, 4c reach the target indoor temperatures Tras, Trbs, Trcs at the indoor units 4a, 4b, 4c by control of the air-cooling capacity as described above.

Thermo control is a control to set a thermo temperature range for the target indoor temperatures Tras, Trbs, Trcs at the indoor units 4a, 4b, 4c, and perform indoor thermo-off, indoor thermo-on, outdoor thermo-off, and outdoor thermo-on. Here, indoor thermo-off is to suspend the air conditioning operation of the indoor unit performing air conditioning operation within the scope of the thermo temperature range when the indoor temperature at the indoor unit deviates from the thermo temperature range. Indoor thermo-on is to restart the air conditioning operation of the indoor unit in the indoor thermo-off state when the indoor temperature at the indoor unit in the indoor thermo-off state deviates from the thermo temperature range. Outdoor thermo-off is to stop the compressor 21 when all indoor units performing air conditioning operations have assumed the indoor thermo-off state. Outdoor thermo-on is to restart the compressor 21 when at least one indoor unit assumes the indoor thermo-on state during the outdoor thermo-off state. In this embodiment, upper limit values Trax, Trbx, Trcx of the thermo temperature range at the indoor units 4a, 4b, 4c are values obtained by adding upper limit ranges $\Delta Tax$, $\Delta Tbx$, $\Delta Tcx$ to the target indoor temperature Tras, Trbs, Trcs. Lower limit values Tran, Trbn, Trcn of the thermo temperature range at the indoor units 4a, 4b, 4c are values obtained by subtracting lower limit ranges $\Delta Tan$, $\Delta Tbn$, $\Delta Tcn$ from the target indoor temperatures Tras, Trbs, Trcs.

For example, if the indoor unit 4a is an indoor unit performing the air-cooling operation, the controller 8 suspends the air-cooling operation of the indoor unit 4a when the indoor temperature Tra at the indoor unit 4a deviates from the thermo temperature range by control of the above air-cooling capacity. More specifically, the controller 8 closes the indoor expansion valve 41a of the indoor unit 4a so that the refrigerant does not flow to the indoor heat exchanger 42a when the indoor temperature Tra drops to the lower limit value Tran by the air-cooling operation. As a consequence thereof, the indoor unit 4a assumes the indoor thermo-off state in which heat exchange between the refrigerant and the indoor air is not performed. Also, the controller 8 closes the indoor expansion valves 41b, 41c of the indoor units 4b, 4c and puts the indoor units 4b, 4c into the indoor thermo-off state, just as with the indoor unit 4a, when the indoor temperatures Trb, Trc drop to the lower limit values Trbn, Tren.

Next, for example, if the indoor unit 4a is an indoor unit in the indoor thermo-off state, the controller 8 restarts the air-cooling operation of the indoor unit 4a when the indoor temperature Tra at the indoor unit 4a deviates from the thermo temperature range. More specifically, the controller 8 opens the indoor expansion valve 41a of the indoor unit 4a so that the refrigerant flows to the indoor heat exchanger 42a when the indoor temperature Tra rises to the upper limit value Trax by suspension of the air-cooling operation. As a consequence thereof, the indoor unit 4a assumes the indoor thermo-on state in which heat exchange between the refrigerant and the indoor air is performed. Also, the controller 8 opens the indoor expansion valves 41b, 41c of the indoor units 4b, 4c and puts the indoor units 4b. 4c into the indoor thermo-on state, just as with the indoor unit 4a, when the indoor temperatures Trb, Trc of the indoor units 4b, 4c in the indoor thermo-off state rise to the upper limit values Trbx. Trcx.

For example, if the indoor units 4a, 4b, 4c are indoor units performing the air-cooling operation and when all of the indoor units 4a, 4b, 4c have assumed the indoor thermo-off state, the controller 8 stops the compressor 21 and stops the flow of refrigerant in the refrigerant circuit 10. As a consequence thereof, the air conditioning apparatus 1 substantially assumes a state in which all air-cooling operations are stopped even though operating commands for the air-cooling operations have been given.

Next, for example, in the outdoor thermo-off state, if the indoor unit 4a is an indoor unit having assumed the indoor thermo-on state, the controller 8 restarts the compressor 21 when the indoor unit 4a assumes the indoor thermo-on state. More specifically, the controller 8 opens the indoor expansion valve 41a of the indoor unit 4a and restarts the compressor 21 so that the refrigerant flows in the refrigerant circuit 10 and to the indoor heat exchanger 42a when the indoor temperature Tra rises to the upper limit value Trax by suspension of the air-cooling operation and stopping of the compressor 21. As a consequence thereof, the air conditioning apparatus 1 assumes the outdoor thermo-on state, and the indoor unit 4a assumes the indoor thermo-on state. Also, the controller 8 opens the indoor expansion valves 41b, 41c of the indoor units 4b, 4c and restarts the compressor 21, putting the air conditioning apparatus 1 into outdoor thermo-on state and putting the indoor units 4b, 4c into the indoor thermo-on state, just as with the indoor unit 4a, when the indoor temperatures Trb. Trc rise to the upper limit values Trbx, Trcx.

—During Air-Warming Operation—

When the air conditioning operation is the air-warming operation, the controller 8 controls the capacity of the compressor 21 on the basis of a target condensation temperature Tcs.

Capacity control of the compressor 21 is accomplished by controlling the rotation speed (operating frequency) of the compressor 21 (more specifically, the compressor motor 21a). Specifically, the rotation speed of the compressor 21 is controlled so that condensation temperature Tc of the refrigerant equivalent to a high pressure Pc of the refrigerant circuit 10 arrives at the target condensation temperature Tcs. Here, high pressure Pc signifies the pressure representative of high-pressure refrigerant flowing from the discharge side of the compressor 21 through the indoor heat exchangers 42a, 42b, 42c the inlets of the indoor expansion valves 41a, 41b, 41c during the air-warming operation. In this embodiment, a discharge pressure Pd being the refrigerant pressure detected by the discharge pressure sensor 30 is used as the high pressure Pc. and a value obtained by converting the discharge pressure Pd to the saturation temperature of the refrigerant is the condensation temperature Tc of the refrigerant.

The target condensation temperature Tcs in capacity control (rotation speed control) of the compressor 21 is decided in the controller 8 on the basis of request values $\Delta$QHa, $\Delta$QHb, $\Delta$QHc concerning the air-warming capacity at each indoor unit 4a, 4b, 4c performing the air-warming operation.

Specifically, first, each temperature difference $\Delta$THra, $\Delta$THrb, $\Delta$THrc is obtained by subtracting each indoor temperature Tra, Trb, Trc from each target indoor temperature Tras, Trbs, Trcs at each indoor unit 4a, 4b, 4c performing the air-warming operation. The request values $\Delta$QHa, $\Delta$QHb, $\Delta$QHc concerning the air-warming capacity at each indoor unit 4a, 4b, 4c performing the air-warming operation are calculated on the basis of these temperature differences $\Delta$THra, $\Delta$THrb, $\Delta$THrc. Here, when the temperature differences $\Delta$THra, $\Delta$THrb, $\Delta$THrc are positive values; i.e., when the indoor temperatures Tra, Trb, Trc have not reached the target indoor temperatures Tras, Trbs, Trcs, this signifies that an increase in air-warming capacity is requested, and the extent of the request for increase in air-warming capacity is greater as the absolute values of these are greater. Meanwhile, when the temperature differences $\Delta$THra, $\Delta$THrb. $\Delta$THrc are negative values; i.e., when the indoor temperatures Tra, Trb, Trc have reached the target indoor temperatures Tras, Trbs, Tres, this signifies that a decrease in air-warming capacity is requested, and the extent of the request for decrease in air-warming capacity is greater as the absolute values of these are greater. Therefore, the request values $\Delta$QHa, $\Delta$QHb, $\Delta$QHc concerning the air-warming capacity also, just as the temperature differences $\Delta$THra, $\Delta$THrb, $\Delta$THrc, are values signifying the direction and extent of increase or decrease in air-warming capacity.

When an increase in air-warming capacity is requested; i.e., when the request values $\Delta$QHa, $\Delta$QHb, $\Delta$QHc concerning the air-warming capacity are positive values, the target condensation temperature Tcs is decided to be higher than the current value in accordance with the extent of increase (absolute value of the request value), whereby the rotation speed of the compressor 21 is increased and the air-warming capacity is increased. Meanwhile, when a decrease in air-warming capacity is requested; i.e., when the request values $\Delta$QHa, $\Delta$QHb, $\Delta$QHc concerning the air-warming capacity are negative values, the target condensation temperature Tcs is decided to be lower than the current value in accordance with the extent of decrease (absolute value of the request value), whereby the rotation speed of the compressor 21 is decreased and the air-warming capacity is decreased.

Here, at each indoor unit 4a, 4b, 4c performing the air-warming operation, various requests for increase or decrease in air-warming capacity (request values $\Delta$QHa, $\Delta$QHb, $\Delta$QHc) are made in accordance with each temperature difference $\Delta$THra, $\Delta$THrb, $\Delta$THrc. However, the target condensation temperature Tcs is a target value that is common to all indoor units 4a, 4b, 4c as with the target evaporation temperature Tes. Therefore, the target condensation temperature Tcs must be set to a value representative of the requests for increase or decrease in air-warming capacity at all indoor units 4a, 4b, 4c. Therefore, the target condensation temperature Tcs is decided on the basis of the request value for which the target condensation temperature Tcs is highest among the request values $\Delta$QHa, $\Delta$QHb, $\Delta$QHc concerning the air-warming capacity. For example, when the request values $\Delta$QHa, $\Delta$QHb, $\Delta$QHc concerning the air-warming capacity are condensation temperatures requested at the indoor units 4a, 4b, 4c, the highest request value of these is selected as the target condensation temperature Tcs. Specifically, when the request value $\Delta$QHa used as the condensation temperature requested at the indoor unit 4a is 45° C., the request value $\Delta$QHb used as the condensation temperature requested at the indoor unit 4b is 43° C., and the request value $\Delta$QHc used as the condensation temperature requested at the indoor unit 4c is 40° C., then 45° C. being the request value $\Delta$QHa that is the highest request value of these is selected as the target condensation temperature Tcs. When the request values $\Delta$QHa, $\Delta$QHb. $\Delta$QHc concerning the air-warming capacity are values indicating the extent of increase or decrease of condensation temperature requested at the indoor units 4a, 4b, 4c, the target condensation temperature Tcs is decided on the basis of the request value for which the air-warming capacity is greatest among these. Specifically, if the current target condensation temperature Tcs is 38° C. and the request values $\Delta$QHa, $\Delta$QHb, $\Delta$QHc concerning the air-warming capacity indicate how high to set the condensation temperature, and when the request value $\Delta$QHa requested at the indoor unit 4a is 7° C., the request value $\Delta$QHb requested at the indoor unit 4b is 5° C., and the request value $\Delta$QHc requested at the indoor unit 4c is 2° C., then 7° C. being the request value $\Delta$QHa that is the greatest request value of these is adopted, and the temperature (45° C.) obtained by adding to the current target condensation temperature Tcs (38° C.) is set as the target condensation temperature Tcs.

In this embodiment, the rotation speed of the compressor 21 is controlled so that the condensation temperature Tc of the refrigerant arrives at the target condensation temperature Tcs, but instead of this, the rotation speed of the compressor 21 may be controlled so that the high pressure Pc (discharge pressure Pd) equivalent to the condensation temperature Tc of the refrigerant arrives at the target high pressure Pcs. In this case, the request values $\Delta$QHa, $\Delta$QHb, $\Delta$QHc used also become values corresponding to the high pressure Pc or the target high pressure Pcs.

Thermo control, as described below, is performed by the controller 8 when the indoor temperatures Tra, Trb, Trc at the indoor units 4a, 4b, 4c reach the target indoor temperatures Tras, Trbs, Trcs at the indoor units 4a, 4b, 4c by control of the air-warming capacity as described above.

This thermo control, as when the air-cooling operation is performed, is a control to set a thermo temperature range for the target indoor temperatures Tras, Trbs, Trcs at the indoor units 4a, 4b, 4c, and perform indoor thermo-off, indoor thermo-on, outdoor thermo-off, and outdoor thermo-on.

For example, if the indoor unit 4a is an indoor unit performing the air-warming operation, the controller 8 suspends the air-warming operation of the indoor unit 4a when the indoor temperature Tra at the indoor unit 4a deviates from the thermo temperature range by control of the air-warming capacity. More specifically, the controller 8 closes the indoor expansion valve 41a of the indoor unit 4a so that the refrigerant does not flow to the indoor heat exchanger 42a when the indoor temperature Tra rises to the upper limit value Trax by the air-warming operation. As a consequence thereof, the indoor unit 4a assumes the indoor thermo-off state in which heat exchange between the refrigerant and the indoor air is not performed. Also, the controller 8 closes the indoor expansion valves 41b, 41c of the indoor units 4b, 4c and puts the indoor units 4b, 4c into the indoor thermo-off state, just as with the indoor unit 4a, when the indoor temperatures Trb, Trc rise to the upper limit values Trbx, Trcx.

Next, for example, if the indoor unit 4a is an indoor unit in the indoor thermo-off state, the controller 8 restarts the air-warming operation of the indoor unit 4a when the indoor temperature Tra at the indoor unit 4a deviates from the thermo temperature range. More specifically, the controller 8 opens the indoor expansion valve 41a of the indoor unit 4a so that the refrigerant flows to the indoor heat exchanger 42a when the indoor temperature Tra drops to the lower limit value Tran by suspension of the air-warming operation. As a consequence thereof, the indoor unit 4a assumes the indoor thermo-on state in which heat exchange between the refrigerant and the indoor air is performed. Also, the controller 8 opens the indoor expansion valves 41b, 41c of the indoor units 4b, 4c and puts the indoor units 4b, 4c into the indoor thermo-on state, as with the indoor unit 4a, when the indoor temperatures Trb, Trc of the indoor units 4b, 4c in the indoor thermo-off state drop to the lower limit values Trbn, Trcn.

For example, if the indoor units 4a, 4b, 4c are indoor units performing the air-cooling operation and when all of the indoor units 4a, 4b, 4c have assumed the indoor thermo-off state, the controller 8 stops the compressor 21 and stops the flow of refrigerant in the refrigerant circuit 10. As a consequence thereof, the air conditioning apparatus 1 substantially assumes a state in which all air-warming operations are stopped even though operating commands for the air-warming operations have been given.

Next, for example, in the outdoor thermo-off state, if the indoor unit 4a is an indoor unit having become in the indoor thermo-on state, the controller 8 restarts the compressor 21 when the indoor unit 4a assumes the indoor thermo-on state. More specifically, the controller 8 opens the indoor expansion valve 41a of the indoor unit 4a and restarts the compressor 21 so that the refrigerant flows in the refrigerant circuit 10 and to the indoor heat exchanger 42a when the indoor temperature Tra drops to the lower limit value Tran by suspension of the air-warming operation and stopping of the compressor 21. As a consequence thereof, the air conditioning apparatus 1 assumes the outdoor thermo-on state, and the indoor unit 4a assumes the indoor thermo-on state. Also, the controller 8 opens the indoor expansion valves 41b, 41c of the indoor units 4b, 4c and restarts the compressor 21, putting the air conditioning apparatus 1 into outdoor thermo-on state and putting the indoor units 4b, 4c into the indoor thermo-on state, just as with the indoor unit 4a, when the indoor temperatures Trb, Trc drop to the lower limit values Trbn, Trcn.

Rotation speed control (hereinafter referred to as "normal rotation speed control") of the compressor 21 and thermo control thus are performed as control of the air conditioning capacities in the air conditioning operations. In the air conditioning apparatus 1, the indoor temperatures Tra, Trb, Trc at the indoor units 4a, 4b, 4c performing air conditioning operations are brought to the target indoor temperatures Tras, Trbs, Trcs at the indoor units 4a, 4b, 4c by such control of the air conditioning capacity.

(3) Start/Stop Frequency-Reducing Rotation Speed Control

In this embodiment, the air conditioning capacities (air-cooling capacity and air-warming capacity) are controlled so that the indoor temperatures Tra, Trb, Trc at the indoor units 4a, 4b, 4c are brought to the target indoor temperatures Tras, Trbs, Trcs at the indoor units 4a, 4b, 4c by the air conditioning operations (air-cooling operation and air-warming operation) including the above normal rotation speed control and thermo control.

Figure 3:
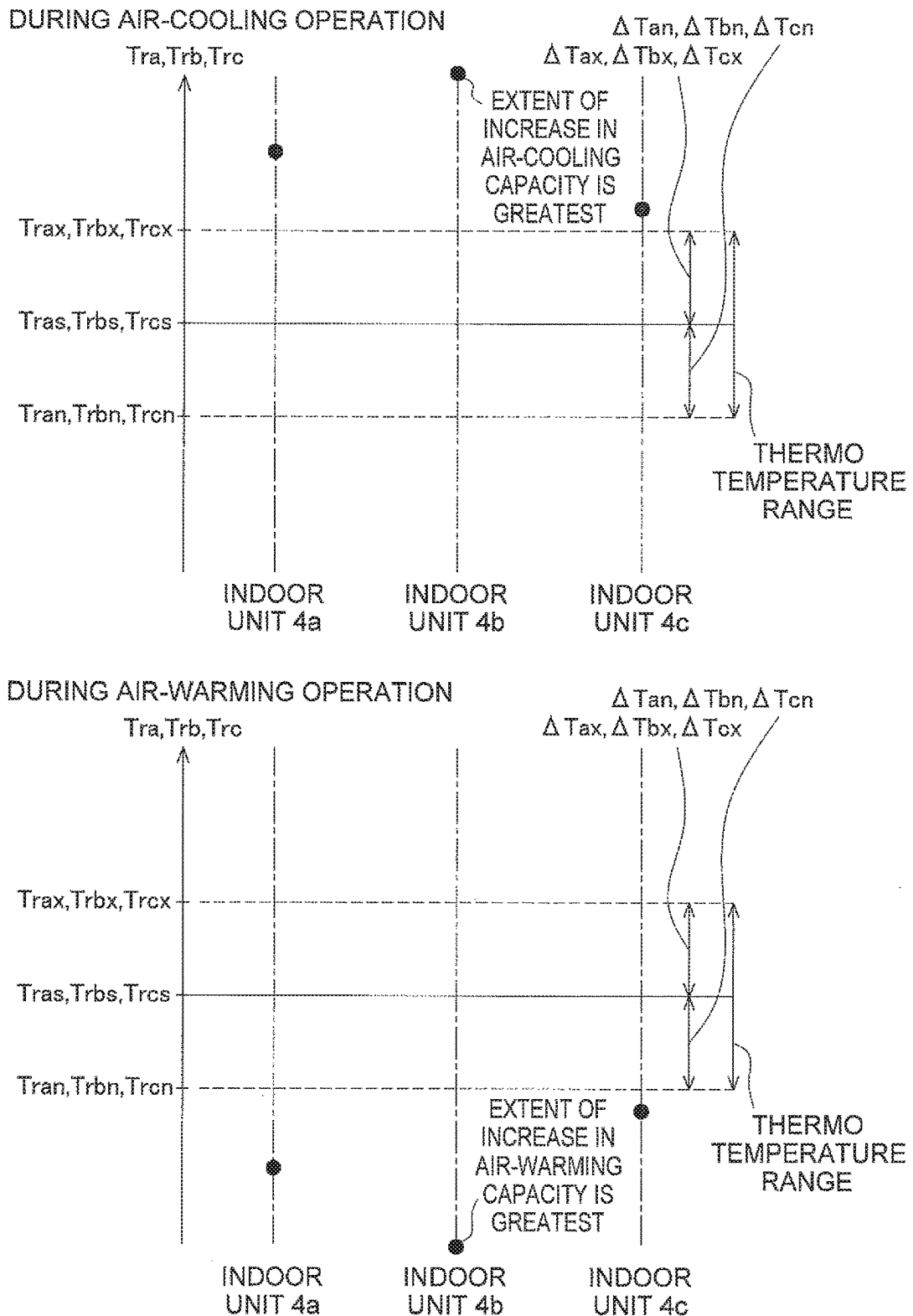
FIG. 3 is a diagram illustrating the relationship between a target indoor temperature and an indoor temperature at each indoor unit performing air conditioning operations (when the indoor temperature greatly deviates from the target indoor temperature).

For example, imagining the case when all of the indoor units 4a, 4b, 4c are performing air conditioning operations, when the air conditioning operations are performed with conditions in which the indoor temperatures Tra, Trb, Trc greatly deviate from the target indoor temperatures Tras, Trbs, Trcs, the rotation speed of the compressor 21 is controlled to high by normal rotation speed control on the basis of the request value (in the present embodiment, the request value $\Delta$QCb, $\Delta$QHb from the indoor unit 4b) for which the extent of increase in air conditioning capacity is greatest among the request values ($\Delta$QCa, $\Delta$QCb, $\Delta$QCc during air-cooling operation, $\Delta$QHa, $\Delta$QHb, $\Delta$QHc during air-warming operation) for air conditioning capacity requested by each indoor unit 4a, 4b, 4c (see FIG. 3). After that, because the request values for air conditioning capacity requested by each indoor unit 4a, 4b, 4c decrease as the indoor temperatures Tra, Trb, Trc come closer to the target indoor temperatures Tras, Trbs, Trcs, the rotation speed of the compressor 21 gradually decreases accordingly, and eventually there appears an indoor unit (in the present embodiment, indoor unit 4c) for which the indoor temperature Tra, Trb, Trc comes within the scope of the thermo temperature range surrounding the target indoor temperature Tras, Trbs, Trcs (see FIG. 4). When the indoor temperature at an indoor unit performing air conditioning operations within the scope of the thermo temperature range deviates from the thermo temperature range (i.e., when air conditioning operations are no longer necessary), indoor thermo-off to suspend the air conditioning operations of the indoor unit (in the present embodiment, indoor unit 4c) is performed by thermo control, and outdoor thermo-off to stop the compressor 21 is further performed when all of the indoor units 4a, 4b, 4c assume the indoor thermo-off state (see FIG. 5).

Figure 6:
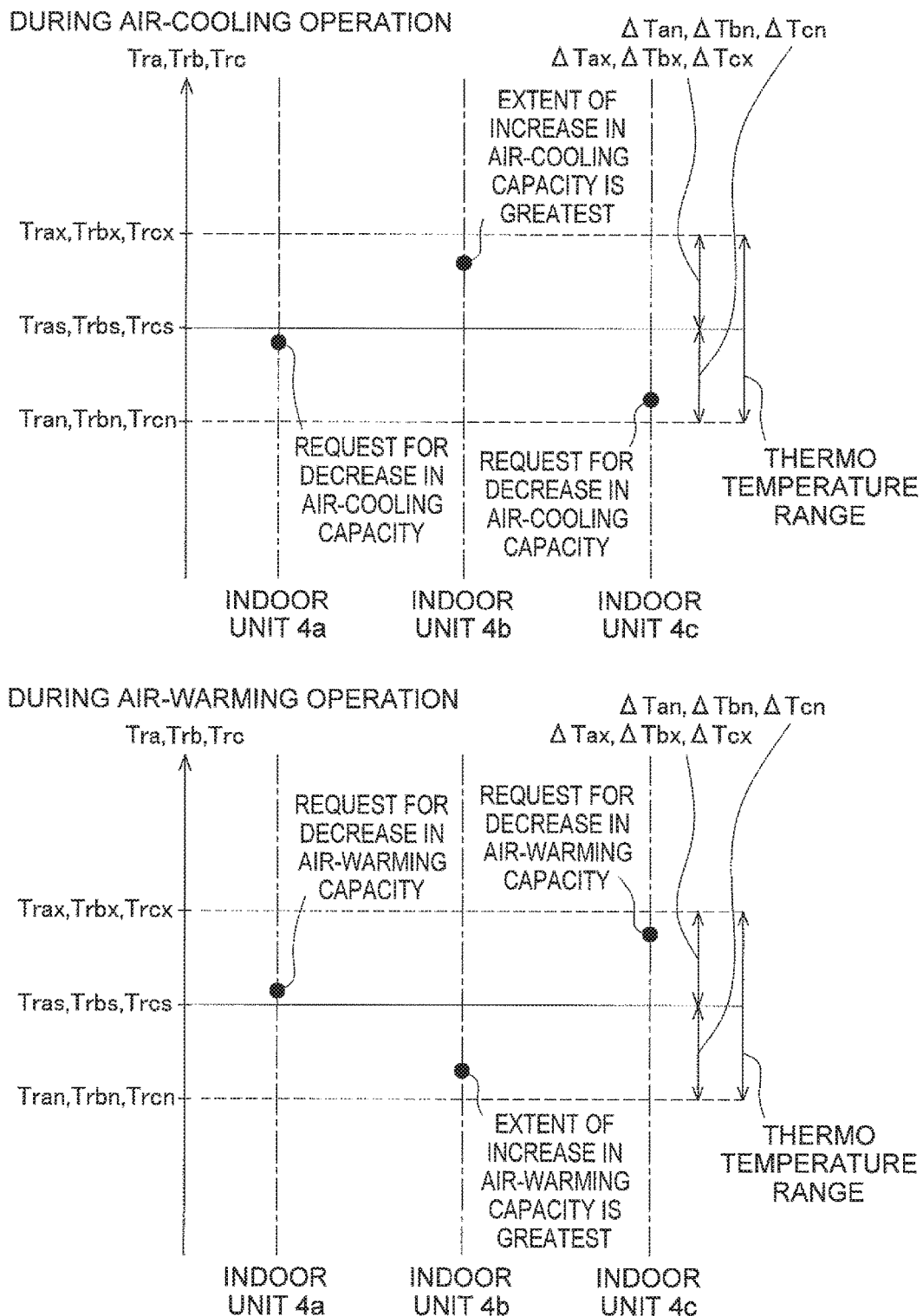
FIG. 6 is a diagram illustrating the relationship between the target indoor temperature and the indoor temperature at each indoor unit performing air conditioning operations (when the indoor temperatures of all indoor units are within the thermo temperature range).

Here, there is a case where the indoor temperatures Tra, Trb. Trc of all indoor units 4a, 4b, 4c performing air conditioning operations are within the scope of the thermo temperature range (see FIG. 6). In such case, air conditioning operations in a state of excess air conditioning capacity occurs, and thermo-start/stop, being the iteration of outdoor thermo-off and outdoor thermo-on, becomes likely to occur. In other words, when normal rotation speed control is performed even when the indoor temperatures Tra, Trb, Trc at all indoor units 4a, 4b, 4c performing air conditioning operations are within the scope of the thermo temperature range, the rotation speed of the compressor 21 is controlled on the basis of the request value (in the present embodiment, the request value ΔQCb, ΔQHb from the indoor unit 4b) for which the extent of increase in air conditioning capacity is greatest among the request values for air conditioning capacity requested by each indoor unit 4a, 4b, 4c. Therefore, air conditioning operations in a state of excess air conditioning capacity occur at the indoor units requesting a decrease in air conditioning capacity (i.e., the indoor units that are performing air conditioning operations within the scope of the thermo temperature range and are such that the indoor temperature has reached the target indoor temperature, in the present embodiment, indoor units 4a, 4b), the number of indoor units becoming in the indoor thermo-off state increases, and eventually the state where all of the indoor units become in the indoor thermo-off state and the outdoor thermo-off state is brought about. After that, the indoor thermo-on state and the outdoor thermo-on state are brought about when there arises an indoor unit for which the indoor temperature has deviated from the thermo temperature range, but because the indoor temperature at the indoor units performing air conditioning operations comes within the scope of the thermo temperature range as soon as the air conditioning operations are restarted, air conditioning operations in a state of excess air conditioning capacity again occur, and all of the indoor units assume the indoor thermo-off state and the outdoor thermo-off state.

Thus, air conditioning operations in a state of excess air conditioning capacity occur under conditions in which the indoor temperatures Tra, Trb. Trc at all of the indoor units 4a, 4b, 4c performing air conditioning operations are within the scope of the thermo temperature range; i.e., the indoor temperatures Tra, Trb, Trc are close to the target indoor temperatures Tras, Trbs, Trcs, and thermo-start/stop becomes more likely to occur. Such air conditioning operations in a state of excess air conditioning capacity, or increase of frequency of thermo-start/stop may become a cause of increased power consumption or lowered operating efficiency of the compressor 21, and therefore the situation should be remedied to the extent possible.

Therefore, in the air conditioning apparatus 1, the controller 8 performs start/stop frequency-reducing rotation speed control during air conditioning operations (air-cooling operation and air-warming operation) including normal rotation speed control and thermo control. Here, start/stop frequency-reducing rotation speed control is to control the rotation speed of the compressor 21 on the basis of the request values from the indoor units requesting a decrease in air conditioning capacity, disregarding the request values from the indoor units requesting an increase in air conditioning capacity, when each indoor temperature Tra, Trb, Trc at all indoor units 4a, 4b, 4c performing air conditioning operations is within the scope of a prescribed threshold temperature range surrounding a target indoor temperature Tras, Trbs, Trcs at each indoor unit 4a, 4b, 4c performing air conditioning operations.

Figure 7:
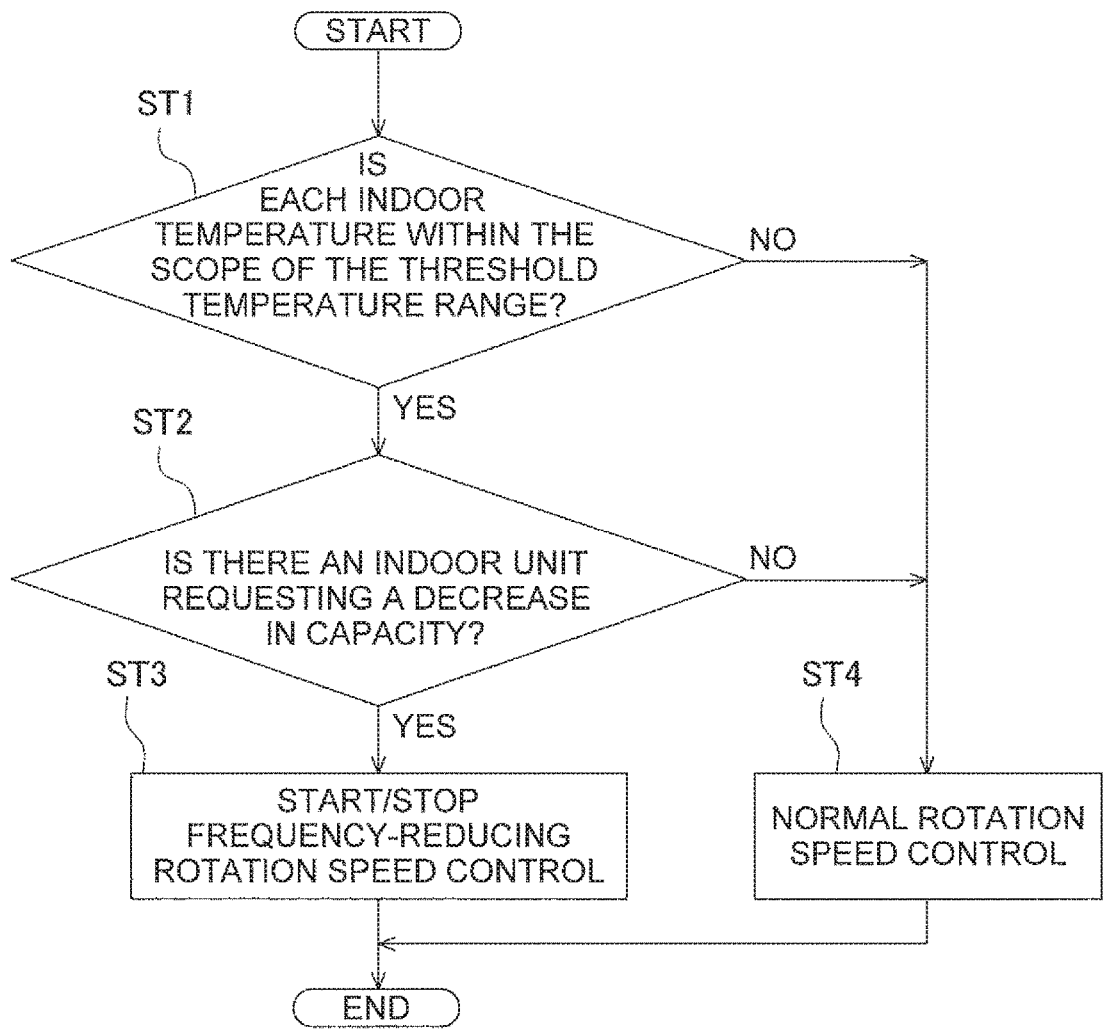
FIG. 7 is a flow chart illustrating rotation speed control of a compressor including start/stop frequency-reducing rotation speed control.
Figure 8:
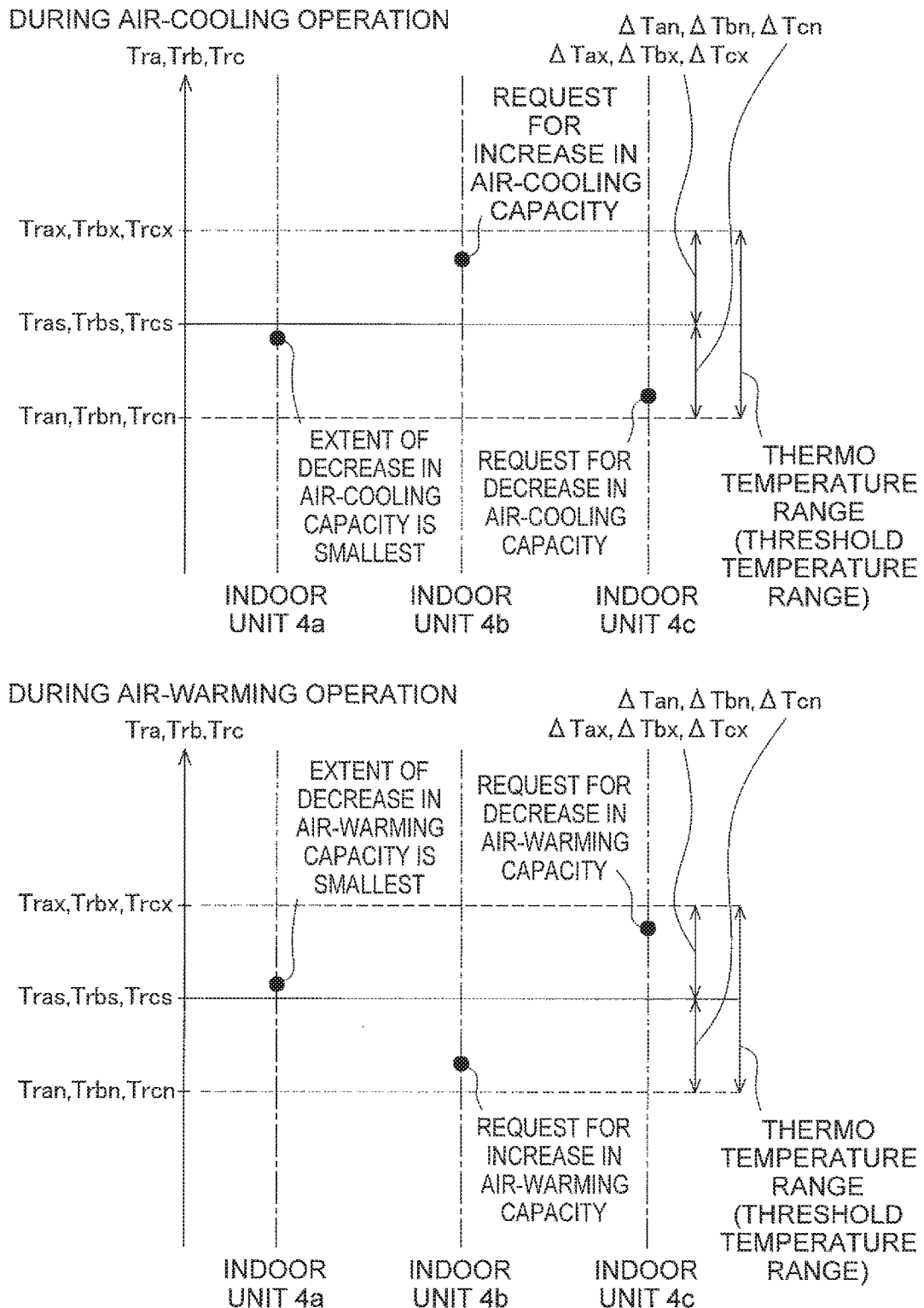
FIG. 8 is a diagram illustrating the relationship between the target indoor temperature and the indoor temperature at each indoor unit performing air conditioning operations (when performing start/stop frequency-reducing rotation speed control).

Next, rotation speed control of the compressor 21 including start/stop frequency-reducing rotation speed control shall be described using FIG. 3 to FIG. 8. FIG. 7 is a flow chart illustrating rotation speed control of compressor 21 including start/stop frequency-reducing rotation speed control. FIG. 8 is a diagram illustrating the relationship between the indoor temperature Tra, Trb, Trc and the target indoor temperature Tras, Trbs, Trcs at each indoor unit 4a, 4b, 4c performing air conditioning operations (when performing start/stop frequency-reducing rotation speed control). In this embodiment, the description is given imagining the case in which all of the indoor units 4a, 4b, 4c are performing air conditioning operations.

First, in step ST1, the controller 8 determines whether each indoor temperature Tra, Trb, Trc at all indoor units 4a, 4b, 4c performing air conditioning operations is within the scope of the prescribed threshold temperature range (in the present embodiment, thermo temperature range) surrounding the target indoor temperature Tras, Trbs, Trcs at each indoor unit 4a, 4b, 4c performing air conditioning operations. When it is determined that each indoor temperature Tra, Trb, Trc at all indoor units 4a, 4b, 4c performing air conditioning operations is within the scope of the prescribed threshold temperature range and the condition that the indoor temperatures Tra, Trb, Trc be close to the target indoor temperatures Tras, Trbs, Trcs is satisfied (see FIG. 6 and FIG. 8), the flow transitions to the process of step ST2.

Meanwhile, when it is not determined in step ST1 that each indoor temperature Tra, Trb, Trc at all indoor units 4a, 4b, 4c performing air conditioning operations is within the scope of the prescribed threshold temperature range and the condition that the indoor temperatures Tra, Trb, Trc be close to the target indoor temperatures Tras, Trbs, Trcs is not satisfied, it is the case when there is an indoor unit for which the indoor temperature Tra, Trb, Trc, is beyond the scope of the threshold temperature range and increase in air conditioning capacity is being requested (see FIG. 3 and FIG. 4), and therefore the flow transitions to the process of normal rotation speed control in step ST4.

Figure 4:
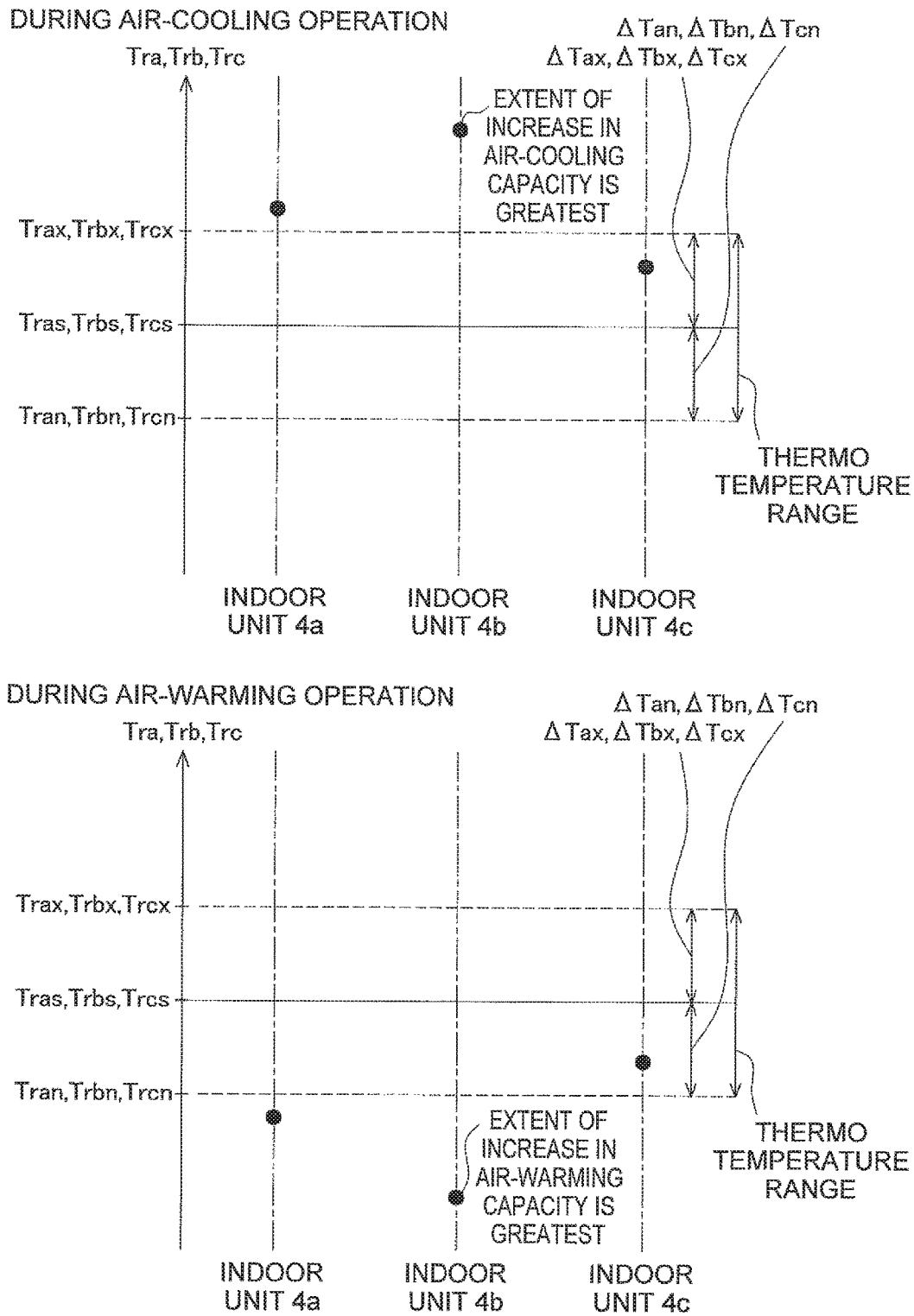
FIG. 4 is a diagram illustrating the relationship between the target indoor temperature and the indoor temperature at each indoor unit performing air conditioning operations (when there is an indoor unit within a thermo temperature range).
Figure 5:
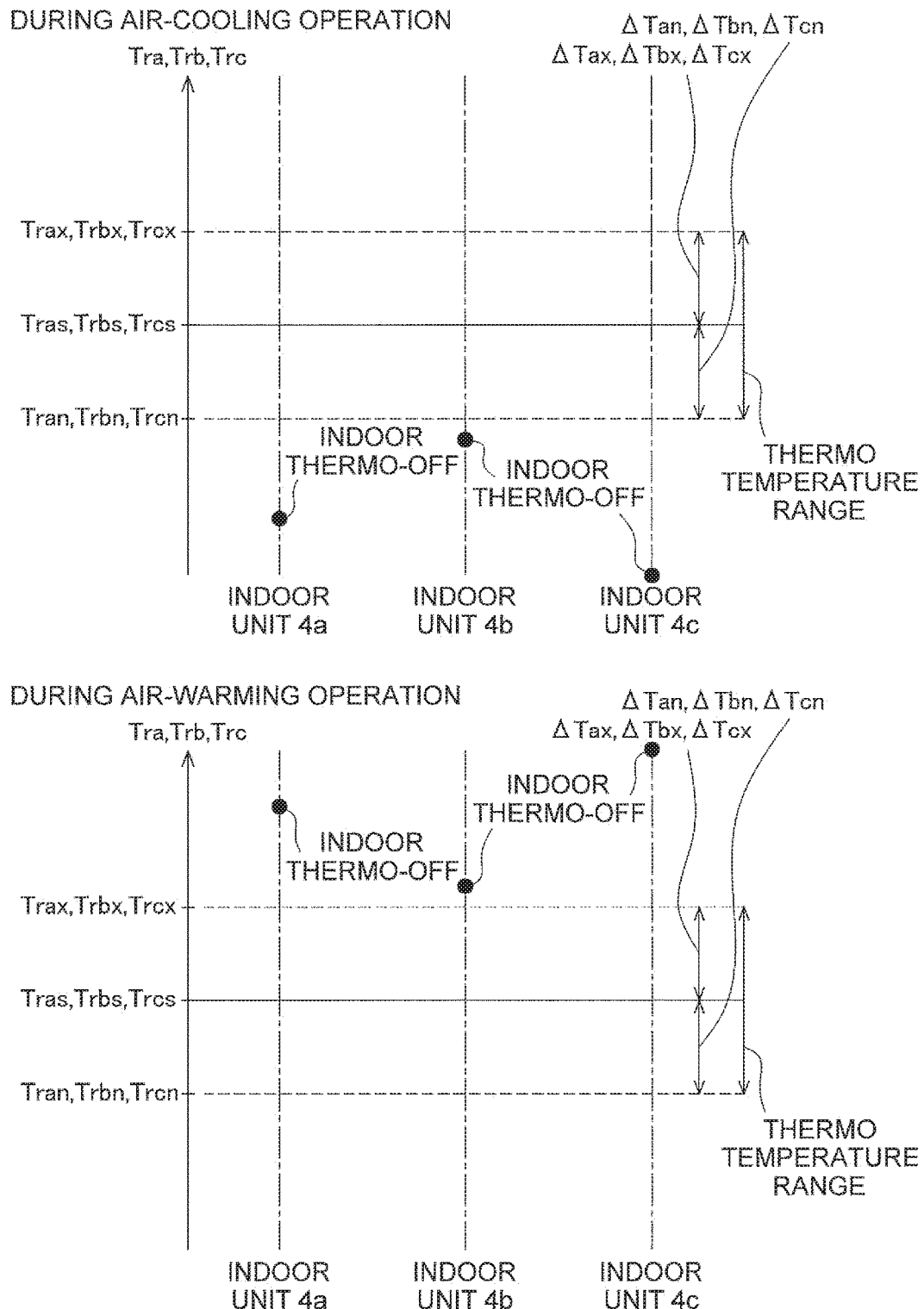
FIG. 5 is a diagram illustrating the relationship between the target indoor temperature and the indoor temperature at each indoor unit performing air conditioning operations (when all indoor units have assumed the thermo-off state).

Here, the details of the processing of normal rotation speed control in step ST4 are the same as those of the control already described. In other words, when there is an indoor unit for which the indoor temperature is beyond the scope of the threshold temperature range and air conditioning capacity is being requested, the rotation speed of the compressor 21 is controlled on the basis of the request value for which the extent of increase in air conditioning capacity is greatest, so that the indoor temperatures Tra, Trb, Trc are quickly brought closer to the target indoor temperatures Tras, Trbs, Trcs. For example, as illustrated in FIG. 3, when each indoor temperature Tra, Trb, Trc at all indoor units 4a, 4b, 4c performing air conditioning operations is beyond the scope of the threshold temperature range and increase in air conditioning capacity is being requested, the target evaporation temperature Tes or the target condensation temperature Tcs is decided on the basis of the request value (in the present embodiment, the request value ΔQCb. ΔQHb from the indoor unit 4b) for which the extent of increase in air conditioning capacity is greatest among the request values from the indoor units 4a, 4b, 4c requesting an increase in air conditioning capacity. Also, as illustrated in FIG. 4, when each indoor temperature (in FIG. 4, the indoor temperatures Tra, Trb) at some of the indoor units (in FIG. 4, the indoor units 4a, 4b) performing air conditioning operations is beyond the scope of the threshold temperature range and increase in air conditioning capacity is being requested, the target evaporation temperature Tes or the target condensation temperature Tcs is decided on the basis of the request value (in the present embodiment, the request value ΔQCb, ΔQHb from the indoor unit 4b) for which the extent of increase in air conditioning capacity is greatest among the request values from the indoor units 4a, 4b, 4c requesting an increase in air conditioning capacity. The rotation speed of the compressor 21 is controlled so that the evaporation temperature Te of the refrigerant arrives at the decided target evaporation temperature Tes or so that the condensation temperature Tc of the refrigerant arrives at the decided target condensation temperature Tcs.

Next, in step ST2, the controller 8 determines whether there is an indoor unit requesting a decrease in air conditioning capacity among the indoor units 4a, 4b, 4c performing air conditioning operations. When there is an indoor unit requesting a decrease in air conditioning capacity (for example, indoor units 4a, 4c in FIG. 6 and FIG. 8), the flow transitions to the process of start/stop frequency-reducing rotation speed control in step ST3.

When it is not determined in step ST2 that there is an indoor unit requesting a decrease in air conditioning capacity, and when there is an indoor unit for which the indoor temperature is within the scope of the threshold temperature range and increase in air conditioning capacity is being requested, the flow transitions to the process of normal rotation speed control in step ST4. In other words, in this case as well, as in the case when there is an indoor unit for which the indoor temperature is beyond the scope of the threshold temperature range and air conditioning capacity is being requested, normal rotation speed control in step ST4 is performed so that the indoor temperatures Tra, Trb, Trc are quickly brought closer to the target indoor temperatures Tras, Trbs. Trcs.

Next, in step ST3, the controller 8 controls the rotation speed of the compressor 21 on the basis of the request values from the indoor units requesting a decrease in air conditioning capacity, disregarding the request values from the indoor units requesting an increase in air conditioning capacity. For example, when the indoor unit 4b is requesting an increase in air conditioning capacity and the indoor units 4a, 4c are requesting a decrease in air conditioning capacity among the indoor units 4a, 4b, 4c performing air conditioning operations (see FIG. 8), the target evaporation temperature Tes or the target condensation temperature Tcs is decided on the basis of the request value ΔQCa. ΔQHa from the indoor unit 4a and the request value ΔQCc, ΔQHc from the indoor unit 4c requesting a decrease in air conditioning capacity, disregarding, disregarded the request value ΔQCb, ΔQHb from the indoor unit 4b requesting an increase in air conditioning capacity. The rotation speed of the compressor 21 is controlled so that the evaporation temperature Te of the refrigerant arrives at the target evaporation temperature Tes or so that the condensation temperature Tc of the refrigerant arrives at the target condensation temperature Tcs. In other words, given that, in normal rotation speed control in step ST4, the target evaporation temperature Tes or the target condensation temperature Tcs is decided on the basis of the request value ΔQCb, ΔQHb from the indoor unit 4b for which increase in air conditioning capacity is being requested and the greatest air conditioning capacity is obtained, among the request values from the indoor units 4a, 4b, 4c during air conditioning operations, in the present embodiment, the target evaporation temperature Tes or the target condensation temperature Tcs is decided on the basis of the request value ΔQCa, ΔQHa from the indoor unit 4a and the request value ΔQCc, ΔQHc from the indoor unit 4c requesting a decrease in air conditioning capacity.

By performing such start/stop frequency-reducing rotation speed control, the target evaporation temperature Tes can be set high or the target condensation temperature Tcs can be set low under conditions in which the indoor temperatures Tra, Trb, Trc at all of the indoor units 4a, 4b, 4c performing air conditioning operations are within the scope of the thermo temperature range; i.e., the indoor temperatures Tra, Trb, Trc are close to the target indoor temperatures Tras, Trbs, Trcs. By doing so, the rotation speed of the compressor 21 can be kept low and the occurrence of stopping of the compressor 21. i.e., outdoor thermo-off can be suppressed while reducing the air conditioning capacity.

Here, when there is only one indoor unit requesting a decrease in air conditioning capacity, it suffices that the target evaporation temperature Tes or the target condensation temperature Tcs is decided on the basis of the request value from that indoor unit. However, when there are a plurality of indoor units requesting a decrease in air conditioning capacity (see FIG. 8), the extent of reduction of the frequency of thermo-start/stop, or the like, varies depending on how the request value ΔQCa, ΔQHa from the indoor unit 4a and the request value ΔQCc, ΔQHc from the indoor unit 4c requesting a decrease in air conditioning capacity are used. Here, the extent of reduction of the frequency of thermo-start/stop is improved when the rotation speed of the compressor 21 is kept low, but there appears a tendency for the air conditioning capacity to become insufficient at the indoor unit 4b requesting an increase in air conditioning capacity, and the indoor temperature Trb having come close to the target indoor temperature Trbs up to within the scope of the threshold temperature range might deviate from the target indoor temperature Trbs and go beyond the scope of the threshold temperature range.

Therefore, in the present embodiment, the target evaporation temperature Tes or the target condensation temperature Tcs is decided on the basis of the request value ΔQCa, ΔQHa from the indoor unit 4a for which the extent of decrease in air conditioning capacity is smallest between the request value ΔQCa. ΔQHa from the indoor unit 4a and the request value ΔQCc. ΔQHc from the indoor unit 4c requesting a decrease in air conditioning capacity.

As a consequence thereof, the rotation speed of the compressor 21 can be kept low, and the tendency for the air conditioning capacity to become insufficient at the indoor unit 4b requesting an increase in air conditioning capacity can be suppressed to the extent possible.

(4) Characteristics of the Air Conditioning Apparatus

The air conditioning apparatus 1 has the following characteristics.

<A>

In this embodiment, as described above, start/stop frequency-reducing rotation speed control is performed, controlling the rotation speed of the compressor 21 on the basis of the request values from the indoor units requesting a decrease in air conditioning capacity, disregarding the request values from the indoor units requesting an increase in air conditioning capacity, when each indoor temperature at all indoor units performing air conditioning operations is within the scope of a prescribed threshold temperature range surrounding a target indoor temperature at each indoor unit performing air conditioning operations (see FIG. 8).

As a consequence thereof, in the present embodiment, the rotation speed of the compressor 21 is kept low and the incidence of stopping of the compressor 21; i.e., outdoor thermo-off, can be suppressed while reducing the air conditioning capacity. Therefore, when air conditioning operations are performed under conditions in which the air conditioning capacity requested by each indoor unit is small and the indoor temperature is close to the target indoor temperature, the operation of the compressor 21 can be continued to the extent possible while reducing the air conditioning capacity. As a consequence thereof, in the present embodiment, the frequency of thermo-start/stop can be sufficiently reduced while suppressing air conditioning operations in a state of excess air conditioning capacity.

<B>

In this embodiment, as described above, when performing start/stop frequency-reducing rotation speed control, the rotation speed of the compressor 21 is controlled on the basis of the request value for which the extent of decrease in air conditioning capacity is smallest among the request values from the indoor units requesting a decrease in air conditioning capacity. Therefore, the rotation speed of the compressor 21 can be kept low, and the tendency for the air conditioning capacity to become insufficient at indoor units requesting an increase in air conditioning capacity can be suppressed as much as possible.

As for how to use the request values from indoor units requesting a decrease in air conditioning capacity, it may also be considered to use the request value for which the extent of decrease in air conditioning capacity is greatest among the request values from indoor units requesting a decrease in air conditioning capacity, but in this case, although the rotation speed of the compressor 21 can be kept very low, it becomes difficult to suppress the tendency for the air conditioning capacity to become insufficient at indoor units requesting an increase in air conditioning capacity. It may also be considered to use the average value of the request values from indoor units requesting a decrease in air conditioning capacity, but in this case, the extent of keeping down the rotation speed of the compressor 21 or the extent of suppressing the tendency for the air conditioning capacity to become insufficient at indoor units requesting an increase in air conditioning capacity comes to an intermediate extent between that of the case when using the request value for which the extent of decrease in air conditioning capacity is smallest and that of the case when using the request value for which the extent of decrease is greatest. Thus, when performing start/stop frequency-reducing rotation speed control, the extent of reduction of the frequency of thermo-start/stop, or the like, comes to vary depending on how the request values from indoor units requesting a decrease in air conditioning capacity are used. In this embodiment, emphasis is placed on the extent of suppressing the tendency for the air conditioning capacity to become insufficient at indoor units requesting an increase in air conditioning capacity, and it is arranged to use the request value for which the extent of decrease in air conditioning capacity is smallest among the request values from indoor units requesting a decrease in air conditioning capacity.

<C>

In this embodiment, as described above, the threshold temperature range is made to coincide with the thermo temperature range. As a consequence thereof, the rotation speed of the compressor 21 can be kept low until all of the indoor units assume indoor thermo-off, and the occurrence of stopping of the compressor 21; i.e., outdoor thermo-off, can be suppressed while reducing the air conditioning capacity.

It is permissible for the threshold temperature range not to coincide with the thermo temperature range. For example, the threshold temperature range can be set wider than the thermo temperature range so that conditions for performing the start/stop frequency-reducing rotation speed control in steps ST1, ST2 above are more easily satisfied.

<D>

In this embodiment, as described above, normal rotation speed control is performed, in which the rotation speed of the compressor 21 is controlled on the basis of the request value for which the extent of increase in air conditioning capacity is greatest among the request values from the indoor units requesting an increase in air conditioning capacity, when there are indoor units for which the indoor temperature is beyond the scope of the threshold temperature range and increase in air conditioning capacity is being requested among the indoor units performing air conditioning operations (see FIG. 3 and FIG. 4).

Therefore, in the present embodiment, the normal rotation speed control and the start/stop frequency-reducing rotation speed control come to be switched in accordance with the indoor temperatures at the indoor units performing air conditioning operations. In other words, when there are indoor units for which the indoor temperature is beyond the scope of the threshold temperature range and air conditioning capacity is being requested, the rotation speed of the compressor 21 is controlled on the basis of the request value for which the extent of increase in air conditioning capacity is greatest, so that the indoor temperatures are quickly brought closer to the target indoor temperature. When the indoor temperatures at all indoor units performing air conditioning operations are within the scope of the threshold temperature range and the air conditioning capacity requested by each indoor unit has become small, the rotation speed of the compressor 21 is controlled on the basis of the request value from the indoor unit requesting a decrease in air conditioning capacity, so that the operation of the compressor 21 can be continued to the extent possible while reducing the air conditioning capacity. As a consequence thereof, in the present embodiment, the indoor temperatures can be quickly brought closer to the target indoor temperature during air conditioning operations, and air conditioning operations in a state of excess air conditioning capacity can be suppressed and the frequency of thermo-start/stop can be reduced thereafter.

In this embodiment, as described above, normal rotation speed control is performed, rather than start/stop frequency-reducing rotation speed control, when there is no indoor unit requesting a decrease in air conditioning capacity, even when the indoor temperature is within the scope of the threshold temperature range, among the indoor units performing air conditioning operations. As a consequence thereof, the conditions for performing start/stop frequency-reducing rotation speed control can be narrowed down to the extent possible, and priority can be given to bringing the indoor temperature quickly closer to the target indoor temperature.

(5) Modifications

<A>

In the above embodiment, a description was given in which the thermo temperature range used as the threshold temperature range is set to the same temperature range for all of the indoor units 4a, 4b, 4c (see FIG. 3 to FIG. 7 and FIG. 8). However, there is no limitation to setting to the same temperature range for all of the indoor units; different temperature ranges for each indoor unit are possible.

<B>

In the above embodiment, the start/stop frequency-reducing rotation speed control is applied to an air conditioning apparatus capable of switching between an air-cooling operation and an air-warming operation, but no limitation is provided thereby. For example, the start/stop frequency-reducing rotation speed control may be applied to an air conditioning apparatus dedicated to air-cooling operation or an air conditioning apparatus dedicated to air-warming operation.

INDUSTRIAL APPLICABILITY

The present invention is widely applicable to air conditioning apparatuses that are configured by connecting a plurality of indoor units and an outdoor unit having a compressor and perform air conditioning operations so that an indoor temperature at each indoor unit arrives at a target indoor temperature at each indoor unit.

What is claimed is:

1. An air conditioning apparatus
   a plurality of indoor units;
   an outdoor unit having a compressor, the air conditioning apparatus performing an air conditioning operation so that an indoor temperature at each indoor unit arrives at a target indoor temperature at each indoor unit; and
   a controller configured to control a rotation speed of the compressor based on a request value concerning air conditioning capacity at each indoor unit during the air conditioning operation,
   the controller performing a start/stop frequency-reducing rotation speed control in which the rotation speed of the compressor is controlled based on of the request values from the indoor units requesting a decrease in air conditioning capacity, disregarding the request values from the indoor units requesting an increase in air conditioning capacity, when each indoor temperature at all indoor units performing the air conditioning operation is within a scope of a prescribed threshold temperature range surrounding the target indoor temperature at each indoor unit performing the air conditioning operation.

2. The air conditioning apparatus according to claim 1, wherein
   the start/stop frequency-reducing rotation speed control is performed to control the rotation speed of the compressor based on the request value for which an extent of decrease in air conditioning capacity is smallest among the request values from the indoor units requesting a decrease in air conditioning capacity.

3. The air conditioning apparatus according to claim 2, wherein
   the threshold temperature range is a thermo temperature range that specifies a timing of
   indoor thermo-off, which suspends the air conditioning operations of the indoor units perforating the air conditioning operations, and
   indoor thermo-on, which restarts the air conditioning operations of the indoor units in the indoor thermo-off state.

4. The air conditioning apparatus according to claim 3, wherein the controller performs a normal rotation speed control in which the rotation speed of the compressor is controlled based on the request value for which an extent of increase in air conditioning capacity is greatest among the request values from the indoor units requesting an increase in air conditioning capacity, when there are indoor units for which the indoor temperature is beyond the scope of the threshold temperature range and increase in air conditioning capacity is being requested among the indoor units performing the air conditioning operations.

5. The air conditioning apparatus according to claim 2, wherein
   the controller performs a normal rotation speed control in which the rotation speed of the compressor is controlled based on the request value for which an extent of increase in air conditioning capacity is greatest among the request values from the indoor units requesting an increase in air conditioning capacity, when there are indoor units for which the indoor temperature is beyond the scope of the threshold temperature range and increase in air conditioning capacity is being requested among the indoor units performing the air conditioning operations.

6. The air conditioning apparatus according to claim 1, wherein
   the threshold temperature range is a thermo temperature range that specifies a timing of
   indoor thermo-off, which suspends the air conditioning operations of the indoor units perforating the air conditioning operations, and
   indoor thermo-on, which restarts the air conditioning operations of the indoor units in the indoor then-no-off state.

7. The air conditioning apparatus according to claim 6, wherein
   the controller performs a normal rotation speed control in which the rotation speed of the compressor is controlled based on the request value for which an extent of increase in air conditioning capacity is greatest among the request values from the indoor units requesting an increase in air conditioning capacity, when there are indoor units for which the indoor temperature is beyond the scope of the threshold temperature range and increase in air conditioning capacity is being requested among the indoor units performing the air conditioning operations.

8. The air conditioning apparatus according to claim 1, wherein
   the controller performs a normal rotation speed control in which the rotation speed of the compressor is controlled based on the request value for which an extent of increase in air conditioning capacity is greatest among the request values from the indoor units requesting an increase in air conditioning capacity, when there are indoor units for which the indoor temperature is beyond the scope of the threshold temperature range and increase in air conditioning capacity is being requested among the indoor units performing the air conditioning operations.

* * * * *